United States Patent
Ito et al.

(10) Patent No.: US 11,215,261 B2
(45) Date of Patent: Jan. 4, 2022

(54) VARIABLE STIFFNESS VIBRATION DAMPING DEVICE

(71) Applicant: HONDA MOTOR CO., LTD., Tokyo (JP)

(72) Inventors: Yuho Ito, Wako (JP); Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 120 days.

(21) Appl. No.: 16/800,859

(22) Filed: Feb. 25, 2020

(65) Prior Publication Data
US 2020/0271188 A1 Aug. 27, 2020

(30) Foreign Application Priority Data
Feb. 27, 2019 (JP) .............................. JP2019-034953

(51) Int. Cl.
*F16F 9/348* (2006.01)
*F16F 9/53* (2006.01)

(52) U.S. Cl.
CPC .......... *F16F 9/3485* (2013.01); *F16F 9/3481* (2013.01); *F16F 9/53* (2013.01); *F16F 2222/06* (2013.01); *F16F 2228/066* (2013.01)

(58) Field of Classification Search
CPC .......... F16F 9/3485; F16F 9/3481; F16F 9/53; F16F 2222/06; F16F 2228/066
See application file for complete search history.

(56) References Cited

U.S. PATENT DOCUMENTS

| 4,936,556 | A | * | 6/1990 | Makibayashi | .......... F16F 13/16 |
| | | | | | 267/140.13 |
| 5,842,677 | A | * | 12/1998 | Sweeney | ............... F16F 1/3863 |
| | | | | | 248/635 |

(Continued)

FOREIGN PATENT DOCUMENTS

FR 2634530 A1 1/1990
JP H0557478 U 7/1993
(Continued)

OTHER PUBLICATIONS

China First Notification of Office Action for CN Patent Application 202010118669.6 dated Jun. 17, 2021; 22 pp.

*Primary Examiner* — Nishal R Sahni
(74) *Attorney, Agent, or Firm* — Armstrong Teasdale LLP

(57) ABSTRACT

A variable stiffness vibration damping device includes a first support member, a second support member, a pair of main elastic members, a partition elastic member, a first communication passage, a pair of first radial walls, a second communication passage, a coil, a yoke, and a magnetic fluid. The second support member includes an axial portion. The first communication passage is provided in one of the first support member and the axial portion such that a first liquid chamber and a second liquid chamber communicate via the first communication passage. The pair of first radial walls partition one of the first liquid chamber and the second liquid chamber into a pair of third liquid chambers. The second communication passage is provided in the one of the first support member and the axial portion such that the pair of third liquid chambers communicate via the second communication passage.

10 Claims, 17 Drawing Sheets

(56) References Cited

U.S. PATENT DOCUMENTS

| | | | |
|---|---|---|---|
| 6,644,634 B1 | 11/2003 | Ersoy et al. | |
| 9,765,845 B2 * | 9/2017 | Bradshaw | B60K 5/1208 |
| 2009/0178892 A1 * | 7/2009 | Lamers | F16F 7/1005 |
| | | | 188/267 |
| 2009/0321202 A1 * | 12/2009 | Hamada | F16F 13/1463 |
| | | | 188/322.5 |
| 2010/0038195 A1 * | 2/2010 | Kojima | F16F 13/305 |
| | | | 188/267.1 |
| 2020/0269672 A1 * | 8/2020 | Ito | B60K 5/1216 |
| 2020/0271187 A1 * | 8/2020 | Ito | F16F 9/53 |
| 2020/0271188 A1 * | 8/2020 | Ito | F16F 9/53 |

FOREIGN PATENT DOCUMENTS

| | | |
|---|---|---|
| JP | H07280024 A | 10/1995 |
| JP | 2002327787 A | 11/2002 |
| JP | 2004263783 A | 9/2004 |
| JP | 2005098312 A | 4/2005 |
| JP | 2005239084 A | 9/2005 |
| JP | 2017044220 A | 3/2017 |
| JP | 2017078491 A | 4/2017 |

* cited by examiner

VARIABLE STIFFNESS VIBRATION DAMPING DEVICE

TECHNICAL FIELD

The present invention relates to a variable stiffness vibration damping device filled with a magnetic fluid.

BACKGROUND ART

A known liquid filled vibration damping device, which is used for a liquid filled engine mount and the like, includes a first mounting member mounted to a vibration source side, a second mounting member mounted to a vibration receiving side, an insulator (anti-vibration rubber) made of an elastic material such as rubber and interposed between the first mounting member and the second mounting member, a liquid chamber having a wall partially defined by the insulator, a partition member partitioning an inside of the liquid chamber into a primary liquid chamber and a secondary liquid chamber, a diaphragm closing the secondary liquid chamber, and a resonance orifice connecting the primary liquid chamber and the secondary liquid chamber (for example, JP2005-98312A and JP2004-263783A).

When low-amplitude vibrations are generated, the engine mount is required to absorb an internal pressure of the primary liquid chamber and to function as a low dynamic spring. When high-amplitude vibrations having a higher amplitude than the low-amplitude vibrations are generated, the engine mount is required to have high damping characteristics. In the liquid filled vibration damping device disclosed in JP2005-98312A, in order to further improve the function as the low dynamic spring and the high damping characteristics, the partition member is provided with a non-stretchable cloth partition membrane that is loosened in an initial state. On the other hand, in the liquid filled engine mount disclosed in JP2004-263783A, the partition member is composed of a partition plate and a movable membrane. The movable membrane is made of a rubber elastic body, and is bonded to the partition plate by vulcanization so that the movable membrane is integrated with the partition plate.

These liquid filled vibration damping devices damp low-frequency vibrations (for example, vibrations of 0 Hz to 15 Hz) with a high amplitude by utilizing an orifice resonance. On the other hand, these liquid filled vibration damping devices absorb high-frequency vibrations with a low amplitude by deforming the cloth partition membrane or the movable membrane. In these liquid filled vibration damping devices, an amount of a liquid passing through the orifice is adjusted by varying stiffness of the diaphragm, so that a resonance frequency is adjusted.

Also, a so-called active control mount (ACM) is known as an active engine mount (for example, JP2005-239084A). The ACM is provided with an actuator for forcibly vibrating a mass element, so that the ACM can theoretically generate any desired damping force regardless of disturbance working thereon. Therefore, the ACM can realize a high damping effect both in a steady state and in an unsteady state.

However, in the liquid filled vibration damping device disclosed in JP2005-98312A and JP2004-263783A, it is necessary to determine stiffness and damping characteristics of the entire vibration damping device by using parameters such as stiffness and damping characteristics of the anti-vibration rubber, volume of the primary liquid chamber, volume of the secondary liquid chamber, a diameter of the orifice, length of the orifice, stiffness of the membrane, and stiffness of the diaphragm. Accordingly, an adjustment range of the stiffness and the damping characteristics of the entire vibration damping device is narrow, and therefore it is difficult to have desired characteristics at arbitrary frequencies. For example, it is difficult to make adjustments at several frequencies such that the damping characteristics are enhanced when vibrations around 10 Hz that have an influence on riding comfort of an automobile is generated, while the damping characteristics are declined when vibrations around 130 Hz that have an influence on a muffled sound of an engine is generated.

On the other hand, in the ACM, a mechanism for directly inputting external energy thereto becomes complicated. Also, in the ACM, it is necessary to design a control system for avoiding instability and the cost of components thereof is increased. Further, in the vibration damping devices disclosed in any documents mentioned above, it is impossible to adjust stiffness and damping characteristics against vibrations in a direction other than an axial direction along which a load of an engine is generated.

SUMMARY OF THE INVENTION

In view of such a problem of the prior art, a primary object of the present invention is to provide a variable stiffness vibration damping device that can vary stiffness and damping characteristics in the axial direction and the radial direction as desired with a simple configuration.

To achieve such an object, one embodiment of the present invention provides a variable stiffness vibration damping device (10) including: an annular first support member (11) defining an inner hole (13) therein; a second support member (12) including an axial portion (15) penetrating through the inner hole (13) of the first support member (11) in an axial direction and a pair of outer flanges (16) provided at both ends in the axial direction of the axial portion (15) and spaced from the first support member (11) at a prescribed interval in the axial direction; a pair of annular main elastic members (17) connecting the first support member (11) and each of the pair of outer flanges (16) and defining a liquid chamber (18) around the axial portion (15); an annular partition elastic member (20) connecting an inner circumferential portion of the first support member (11) and an outer circumferential portion of the axial portion (15) and partitioning the liquid chamber (18) into a first liquid chamber (18A) and a second liquid chamber (18B); a first communication passage (44) provided in one of the first support member (11) and the axial portion (15) such that the first liquid chamber (18A) and the second liquid chamber (18B) communicate with each other via the first communication passage (44), the first communication passage (44) including a first circumferential passage (41) extending in a circumferential direction; a pair of first radial walls (21) made of elastic materials and partitioning one of the first liquid chamber (18A) and the second liquid chamber (18B) into a pair of third liquid chambers (18C, 18D) opposed to each other in a first radial direction with the axial portion (15) therebetween; a second communication passage (49) provided in the one of the first support member (11) and the axial portion (15) such that the pair of third liquid chambers (18C, 18D) communicate with each other via the second communication passage (49), the second communication passage (49) including a second circumferential passage (46) extending in the circumferential direction; at least one coil (26) wound coaxially with and provided in the one of the first support member (11) and the axial portion (15); a yoke (38) included in the one of the first support member (11) and the axial portion (15) and configured to form a magnetic gap (40) overlapping at least partially with the first circumferential passage (41) and the second circumferential passage (46); and a magnetic fluid (50) filling the first liquid chamber (18A), the second liquid chamber (18B), the first communication passage (44), and the second communication passage (49).

According to this arrangement, a magnetic field is generated around the coil by supplying an electric current thereto, and flow resistance of the magnetic fluid in the first and second circumferential passages of the first and second communication passages is varied by lines of magnetic force passing through the first and second circumferential passages. Therefore, stiffness (specifically, stiffness related to displacement of the first support member and the second support member in the axial direction) and damping characteristics in the axial direction of the variable stiffness vibration damping device can be varied as desired by an electric current flowing through the coil. Also, stiffness (specifically, stiffness related to displacement of the first support member and the second support member in the first radial direction) and damping characteristics in the first radial direction of the variable stiffness vibration damping device can be varied as desired by an electric current flowing through the coil. In addition, stiffness and damping characteristics in the axial direction and the first radial direction of the variable stiffness vibration damping device can be varied with a simple configuration by providing the one of the first support member and the axial portion with the first and second circumferential passages, the coil, and the yoke.

Preferably, the first support member (11) is provided with the first communication passage (44), the second communication passage (49), the at least one coil (26), and the yoke (38).

According to this arrangement, it is possible to lengthen the first and second circumferential passages, compared with a case where the axial portion is provided with the first and second communication passages, the coil, and the yoke. Therefore, stiffness and damping characteristics in the axial direction and the first radial direction of the variable stiffness vibration damping device can be varied greatly.

Preferably, the first circumferential passage (41) and the second circumferential passage (46) are provided in the first support member (11) in a circumferential range larger than 180°.

According to this arrangement, it is possible to lengthen the first and second circumferential passages, and therefore, stiffness and damping characteristics in the axial direction and the first radial direction of the variable stiffness vibration damping device can be varied more greatly.

Preferably, the first circumferential passage (41) and the second circumferential passage (46) are located on an outer circumferential side of the at least one coil (26).

According to this arrangement, it is possible to lengthen the first and second circumferential passages, and therefore, stiffness and damping characteristics in the axial direction and the first radial direction of the variable stiffness vibration damping device can be varied more greatly.

Preferably, the at least one coil (26) includes: a first coil (26A) adjacent to the first circumferential passage (41); and a second coil (26B) adjacent to the second circumferential passage (46), and the yoke (38) includes: a first yoke (38A) configured to form a first magnetic gap (40A) at least partially overlapping with the first circumferential passage (41); and a second yoke (38B) configured to form a second magnetic gap (40B) at least partially overlapping with the second circumferential passage (46).

According to this arrangement, it is possible to individually vary stiffness and damping characteristics in the axial direction of the variable stiffness vibration damping device and stiffness and damping characteristics in the first radial direction thereof by electric currents supplied to the first coil and the second coil.

Preferably, one of the first coil (26A) and the second coil (26B) is located on an outer circumferential side of another of the first coil (26A) and the second coil (26B), and the first circumferential passage (41) and the second circumferential passage (46) are located between the first coil (26A) and the second coil (26B).

According to this arrangement, it is possible to form the first magnetic gap and the second magnetic gap by a common member, so that a configuration of the variable stiffness vibration damping device can be simplified.

Preferably, the first yoke (38A) and the second yoke (38B) include a portion (39) common to each other, and the first coil (26A) and the second coil (26B) are configured to generate magnetic fields in directions opposite to each other.

According to this arrangement, it is possible to downsize the variable stiffness vibration damping device by providing the first yoke and the second yoke with the portion common to each other. Further, a magnetic field generated in the first yoke by supplying an electric current to the first coil and a magnetic field generated in the second yoke by supplying an electric current to the second coil are not weakened due to interference thereof.

Preferably, the variable stiffness vibration damping device (10) further includes: a pair of second radial walls (22) made of elastic materials and partitioning another of the first liquid chamber (18A) and the second liquid chamber (18B) into a pair of fourth liquid chambers (18E, 18F) opposed to each other in a second radial direction crossing the first radial direction with the axial portion (15) therebetween; and a third communication passage (54) provided in the one of the first support member (11) and the axial portion (15) such that the pair of fourth liquid chambers (18E, 18F) communicate with each other via the third communication passage (54), the third communication passage (54) including a third circumferential passage (51) extending in the circumferential direction, and the magnetic gap (40) overlaps at least partially with the third circumferential passage (51).

According to this arrangement, in not only the axial direction and the first radial direction but also the second radial direction, it is possible to vary stiffness and damping characteristics of the variable stiffness vibration damping device as desired by an electric current supplied to the coil.

Preferably, the axial portion (15) has a through hole (8) penetrating therethrough in the axial direction.

According to this arrangement, it is possible to utilize the variable stiffness vibration damping device as a bushing by fastening a member on a vibration source side or a member on a vibration receiving side to the pair of outer flanges of the second support member via a fastening means such as a bolt penetrating through the through hole.

Preferably, the partition elastic member (20) is located at least partially in the inner hole (13) of the first support member (11) and extends in a direction substantially orthogonal to the axial direction.

Preferably, the yoke (38) includes: a passage forming member (35) forming the first circumferential passage (41) and the second circumferential passage (46); and a pair of stacked members (36, 37) stacked in the axial direction with the passage forming member (35) therebetween, and magnetic permeability of the passage forming member (35) is lower than that of the pair of stacked members (36, 37).

Thus, according to an embodiment of the present invention, it is possible to provide a variable stiffness vibration damping device that can vary stiffness and damping characteristics in the axial direction and the radial direction as desired with a simple configuration.

DESCRIPTION OF THE PREFERRED EMBODIMENT(S)

In the following, embodiments of the present invention will be described in detail with reference to the drawings.

First Embodiment

Figure 1:
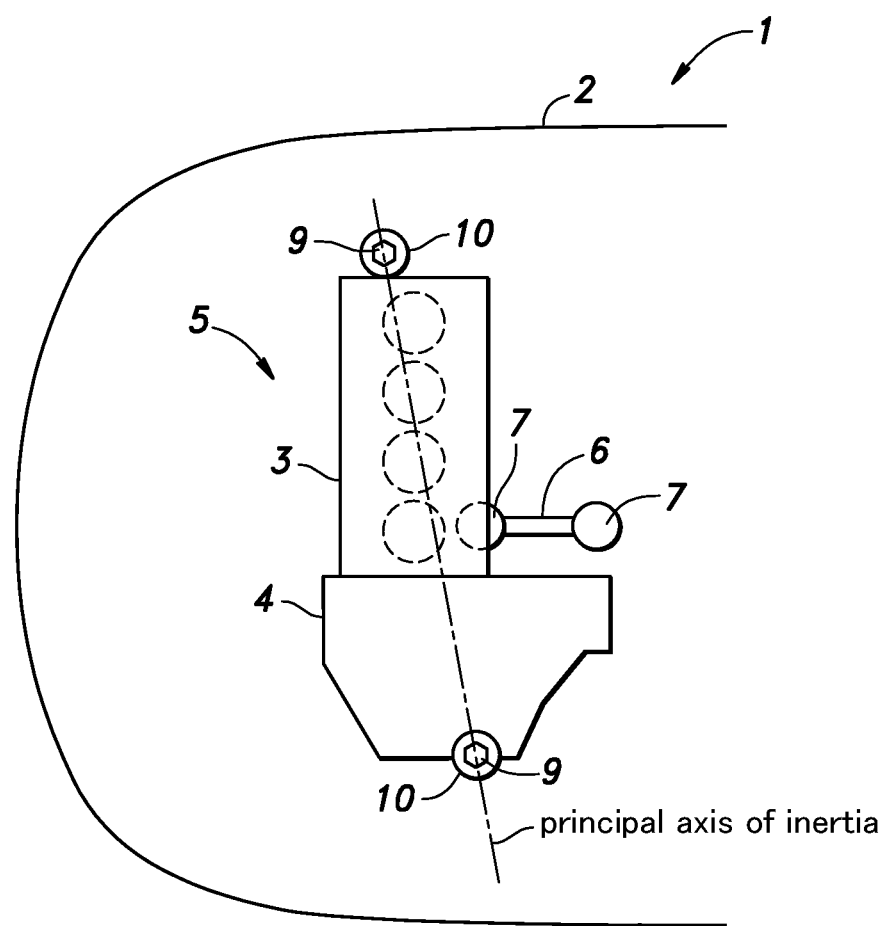
FIG. 1 is a plan view showing variable stiffness vibration damping devices mounted to a vehicle body according to a first embodiment of the present invention.
Figure 2:
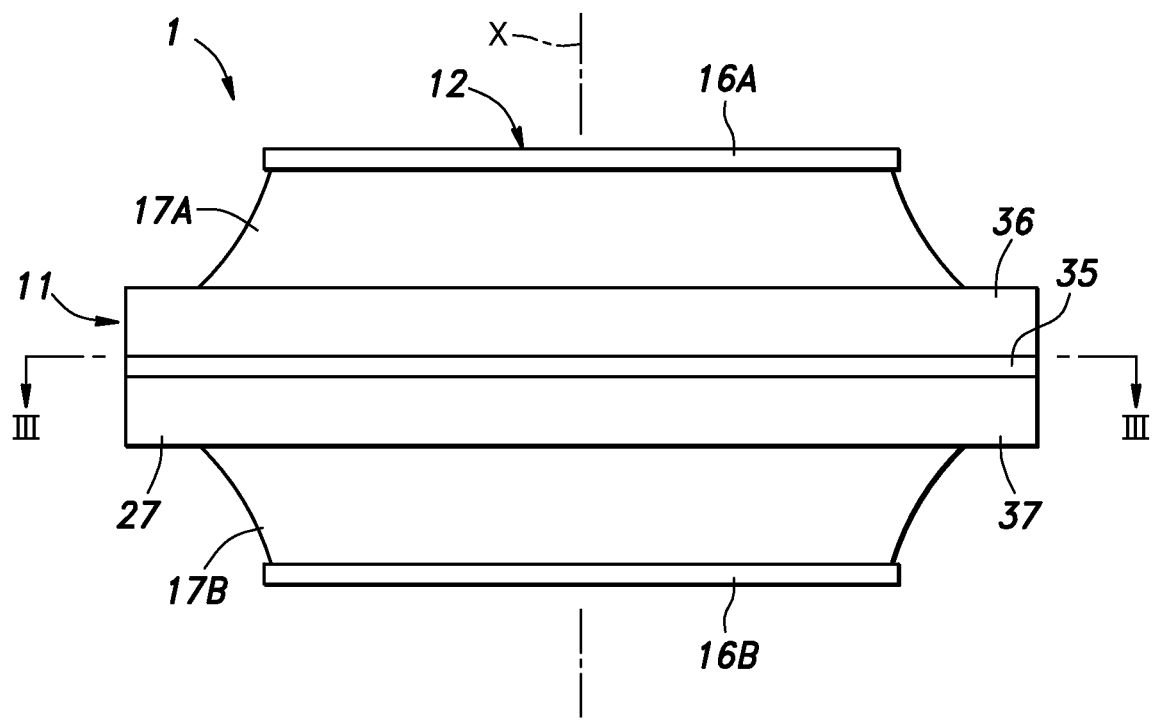
FIG. 2 is a side view of the variable stiffness vibration damping device shown in FIG. 1.

First, a first embodiment of the present invention will be described with reference to FIG. 1 to FIG. 10B. As shown in FIG. 1, an engine 3 is transversely arranged in a front portion of a vehicle body 2 of an automobile 1 (vehicle). A transmission 4 is provided integrally with the engine 3, and a power plant 5 is composed of the engine 3, the transmission 4, and the like. The power plant 5 is supported by the vehicle body 2 via a pair of engine mounts (a side mount and a trans mount) and a torque rod 6. The pair of engine mounts consist of a pair of variable stiffness vibration damping devices 10 (hereinafter simply referred to as "vibration damping devices 10").

The vibration damping devices 10 receive a main load (own weight) of the power plant 5. Each vibration damping device 10 is located on a principal axis of inertia of the whole power plant 5 and is fixed to the vehicle body 2. On the other hand, the torque rod 6 is connected to the engine 3 via a rubber bushing 7 on one longitudinal end thereof, and is connected to the vehicle body 2 via a rubber bushing 7 on another longitudinal end thereof. The torque rod 6 prevents a swing (roll) of the power plant 5 about a roll axis (principal axis of inertia) due to driving torque of the engine 3.

In each vibration damping device 10, a bolt hole 8 (see FIG. 4) is formed along an axis X thereof. A support member (not shown) of the power plant 5 is fastened to each vibration damping device 10 by a bolt 9 (see FIG. 1) screwed into (engaged with) the bolt hole 8. Thereby, the power plant 5 is supported by the vehicle body 2 via each vibration damping device 10.

In the following, one of the vibration damping devices 10 will be described in detail. Hereinafter, an axial direction of the vibration damping device 10 (namely, an extending direction of the bolt hole 8) is defined as a vertical direction based on a mounting posture of the vibration damping device 10 shown in FIG. 1. However, such a definition about the direction does not limit arrangement of the vibration damping device 10.

As shown in FIGS. 2 to 5, the vibration damping device 10 includes a first support member 11 mounted to the vehicle body 2 and a second support member 12 to which the power plant 5 is mounted. The first support member 11 has an annular shape and defines a circular inner hole 13 extending in a direction of the axis X (hereinafter referred to as "axial direction"). The second support member 12 defines the above-mentioned bolt hole 8.

Figure 4:
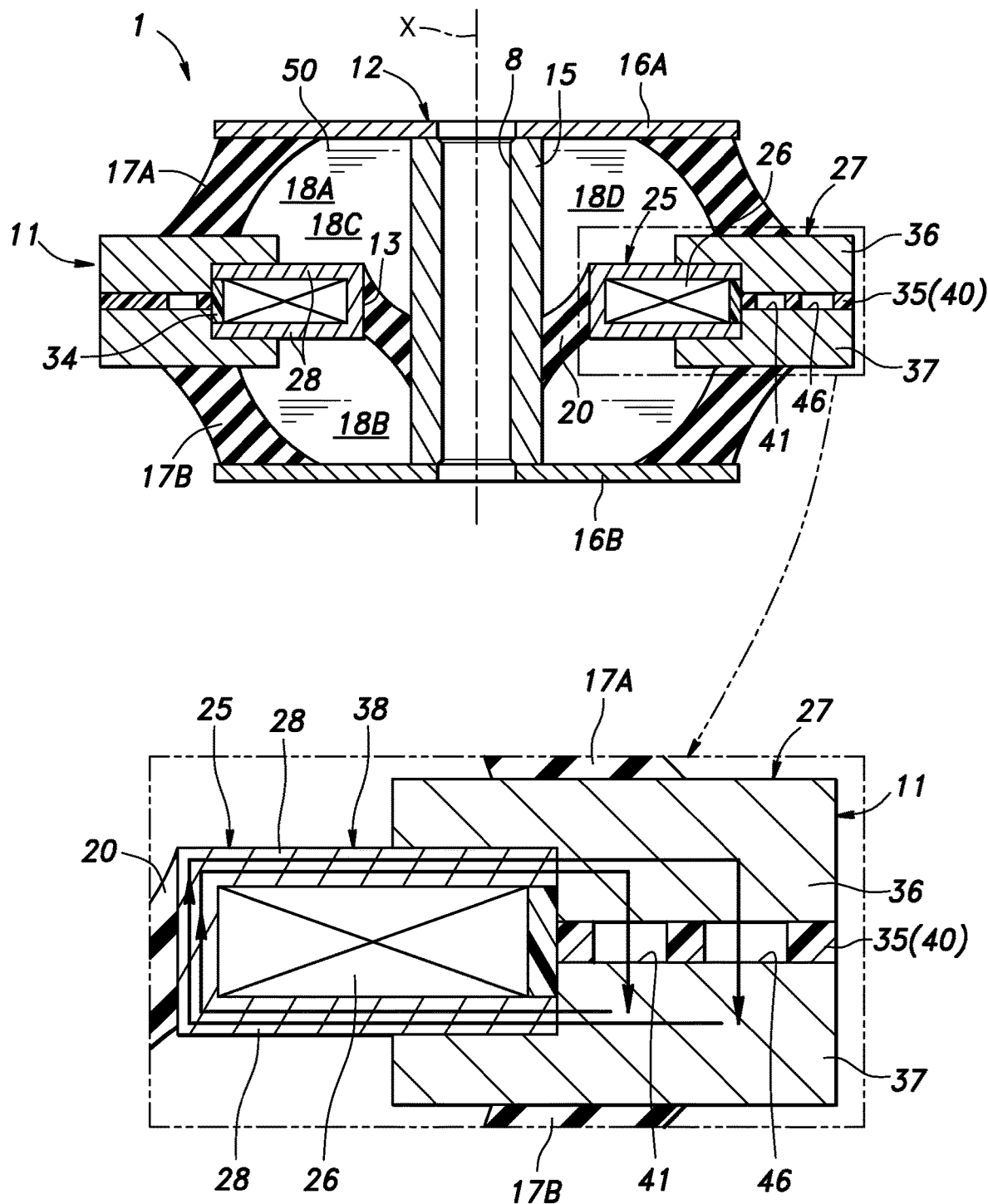
FIG. 4 is a sectional view taken along a line IV-IV of FIG. 3.
Figure 5:
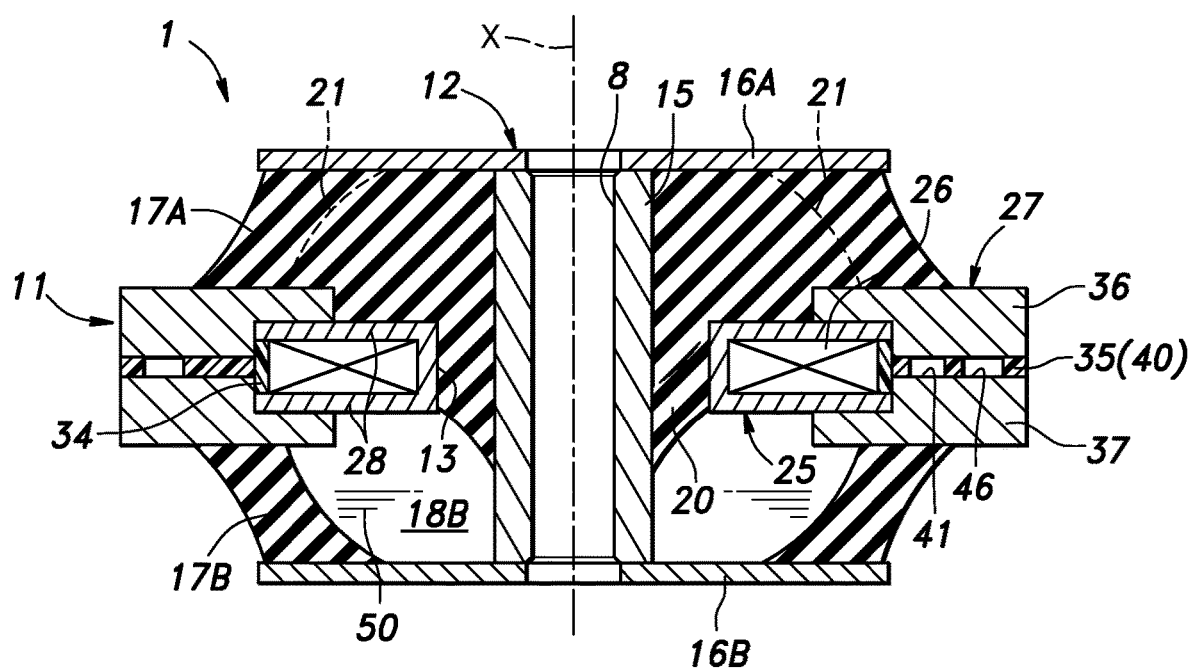
FIG. 5 is a sectional view taken along a line V-V of FIG. 3.

As shown in FIGS. 4 and 5, the second support member 12 includes: an axial portion 15 provided along the axis X; and a pair of outer flanges 16 (upper outer flange 16A and lower outer flange 16B) provided integrally with both ends in the axial direction of the axial portion 15. An outer diameter of the axial portion 15 is smaller than an inner diameter of the first support member 11, and a length in the axial direction of the axial portion 15 is longer than that of the first support member 11. The axial portion 15 penetrates through the inner hole 13 of the first support member 11 in the axial direction. The axial portion 15 has the above-mentioned bolt hole 8 that consists of a through hole (bolt insertion hole) penetrating through the axial portion 15 in the axial direction. Thereby, the axial portion 15 has a cylindrical shape. In other embodiments, the bolt hole 8 may be a bottomed screw hole. Outer diameter of each outer flange 16 is smaller than that of the first support member 11. Each outer flange 16 has a disk-like shape with a through hole formed in the center thereof. Each outer flange 16 is spaced from the first support member 11 at a prescribed interval in the axial direction. The second support member 12 is a rigid member made of metal. For example, the second support member 12 may include a metal having high magnetic permeability such as iron or cobalt, or may include a metal having low magnetic permeability such as aluminum.

An outer circumferential portion of the first support member 11 and an outer circumferential portion of each outer flange 16 of the second support member 12 are connected to each other via a pair of annular main elastic members 17 (upper main elastic member 17A and lower main elastic member 17B). Thereby, a liquid chamber 18 is defined between the first support member 11 and the second support member 12 (i.e. a liquid chamber 18 is defined around the axial portion 15). Each main elastic member 17 is a spring member that absorbs vibrations of the power plant 5, and has a truncated cone shape with an outer diameter of a first side (side of each corresponding outer flange 16) smaller than that of a second side (side of the first support member 11). Each main elastic member 17 is made of an elastic material such as elastomer or rubber. When the second support member 12 receives a load or vibrations of the power plant 5 and thereby vibrates in the axial direction with respect to the first support member 11, one of the pair of main elastic members 17 contracts in the axial direction and another of the pair of main elastic members 17 expands in the axial direction to keep a volume of the liquid chamber 18 constant.

A partition elastic member 20 is partially located in the inner hole 13 of the first support member 11. The partition elastic member 20 extends in a direction substantially orthogonal to the axial direction, and partitions the liquid chamber 18 into a first liquid chamber 18A and a second liquid chamber 18B. The first liquid chamber 18A is formed between the partition elastic member 20 and the upper main elastic member 17A, while the second liquid chamber 18B is formed between the partition elastic member 20 and the lower main elastic member 17B. That is, the first liquid chamber 18A is on a side of the upper main elastic member 17A and partially defined by the upper main elastic member 17A, while the second liquid chamber 18B is on a side of the lower main elastic member 17B and partially defined by the lower main elastic member 17B. The partition elastic member 20 is made of an elastic material such as elastomer or rubber and has a substantially cylindrical shape. An outer circumferential portion of the partition elastic member 20 is coupled to an inner circumferential face of the first support member 11, and an inner circumferential portion of the partition elastic member 20 is coupled to an outer circumferential face of the axial portion 15 of the second support member 12.

A pair of first radial walls 21 are formed in the first liquid chamber 18A. The pair of first radial walls 21 are made of elastic materials and partition the first liquid chamber 18A into a pair of third liquid chambers 18C, 18D opposed to each other in the first radial direction (fore and aft direction) with the axial portion 15 therebetween. That is, the pair of third liquid chambers 18C, 18D opposed to each other in the first radial direction with the axial portion 15 therebetween are partitioned from each other in the circumferential direction by the pair of first radial walls 21. Phases of the pair of third liquid chambers 18C, 18D are different from each other by 180°. In the present embodiment, the pair of third liquid chambers 18C, 18D are opposed to each other in the fore and aft direction. An inner end of each first radial wall 21 is connected to an outer circumferential face of the axial portion 15, an upper end of each first radial wall 21 is connected to a lower face of the upper outer flange 16A, and a lower portion of each first radial wall 21 is connected to an upper face and an inner circumferential face of the first support member 11. The pair of first radial walls 21 are formed integrally with the upper main elastic member 17A and the partition elastic member 20.

The partition elastic member 20 is formed integrally with the first support member 11 and the axial portion 15 of the second support member 12 by pouring unvulcanized rubber into a mold in which the first support member 11 and the second support member 12 are arranged at prescribed positions and then vulcanizing the rubber.

The pair of main elastic members 17 and the pair of first radial walls 21 are formed integrally with the first support member 11 and the second support member 12 by pouring unvulcanized rubber into a mold in which the first support member 11 and the second support member 12, which are integrated by the formation of the partition elastic member 20, are arranged at prescribed positions and then vulcanizing the rubber.

The first support member 11 includes an annular inner yoke 25, a coil 26, and an annular outer yoke 27. The inner yoke 25 is provided in an inner circumferential portion of the first support member 11. The coil 26 is coaxially wound around an outer circumference of the inner yoke 25. The outer yoke 27 is provided in an outer circumferential portion of the first support member 11. The outer yoke 27 is integrated with the inner yoke 25 and surrounds the coil 26 in cooperation with the inner yoke 25.

A pair of outer flange portions 28 that accommodate the coil 26 are formed integrally with upper and lower ends of the inner yoke 25. The pair of outer flange portions 28 compose an upper yoke and a lower yoke.

The coil 26 is formed by winding a coated copper wire around the inner yoke 25 between the pair of outer flange portions 28. Both ends of the coated copper wire, which function as lead wires, are drawn out of the vibration damping device 10. The outer diameter of the coil 26 is smaller than that of each outer flange portion 28. A cylindrical spacer 34 is provided on an outer circumferential side of the coil 26. Upper and lower ends of the spacer 34 abut against outer circumferential portions of the pair of outer flange portions 28. A drawing hole (not shown) is formed in the outer yoke 27, and both ends of the coated copper wire are drawn out of the vibration damping device 10 through the drawing hole.

The outer yoke 27 includes an outer passage forming member 35, an upper outer yoke 36, and a lower outer yoke 37. The outer passage forming member 35 is arranged at an intermediate portion in the axial direction of the outer yoke 27. The upper outer yoke 36 and the lower outer yoke 37 (a pair of stacked members) are stacked in the axial direction with the outer passage forming member 35 therebetween. The upper outer yoke 36 and the lower outer yoke 37 are joined to the outer passage forming member 35 in a state where an outer circumferential portion of the inner yoke 25 is interposed between the upper outer yoke 36 and the lower outer yoke 37. Thereby, the outer yoke 27 is coupled to the inner yoke 25. The inner yoke 25 and the outer yoke 27 compose a yoke 38 (see an enlarged view of FIG. 4) surrounding the coil 26.

The inner yoke 25, the upper outer yoke 36, and the lower outer yoke 37 are made of a metal having high magnetic permeability, and specifically, include a ferromagnetic metal such as iron and cobalt. In the present embodiment, the inner yoke 25, the upper outer yoke 36, and the lower outer yoke 37 are made of iron. The spacer 34 and the outer passage forming member 35 are rigid members made of a non-magnetic metal or resin having a lower magnetic permeability than the metal constituting the inner yoke 25, the upper outer yoke 36, and the lower outer yoke 37. For example, the spacer 34 and the outer passage forming member 35 are made of aluminum (in the drawings, resinous hatching is applied to these members so that these members are easily understood).

The outer passage forming member 35 is made of a non-magnetic material, and thereby an annular magnetic gap 40 is formed in the yoke 38, which is formed around the coil 26 by the inner yoke 25 and the outer yoke 27. The outer passage forming member 35 is provided in an outer circumference of the coil 26, and thereby the magnetic gap 40 is provided in the outer circumference of the coil 26.

Figure 3:
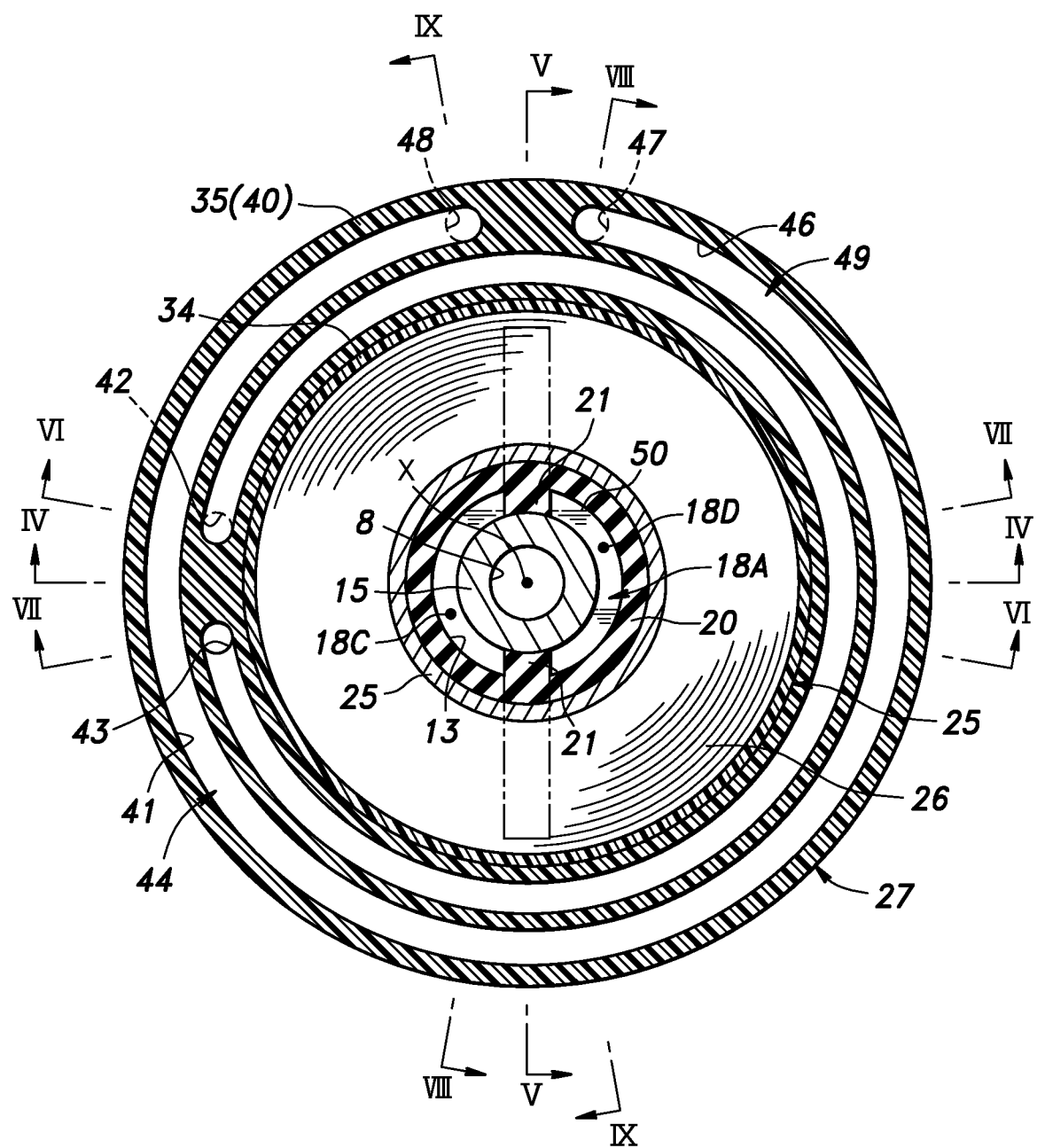
FIG. 3 is a sectional view taken along a line III-III of FIG. 2.

As shown in FIG. 3, the outer passage forming member 35 forms a first circumferential passage 41 in an inner circumferential portion thereof. The first circumferential passage 41 extends in the circumferential direction for an angle larger than 180°. In the present embodiment, the first circumferential passage 41 extends in the circumferential direction for about 340° (an angle smaller than 360°). The first circumferential passage 41 consists of a slot penetrating through the outer passage forming member 35.

Figure 6:
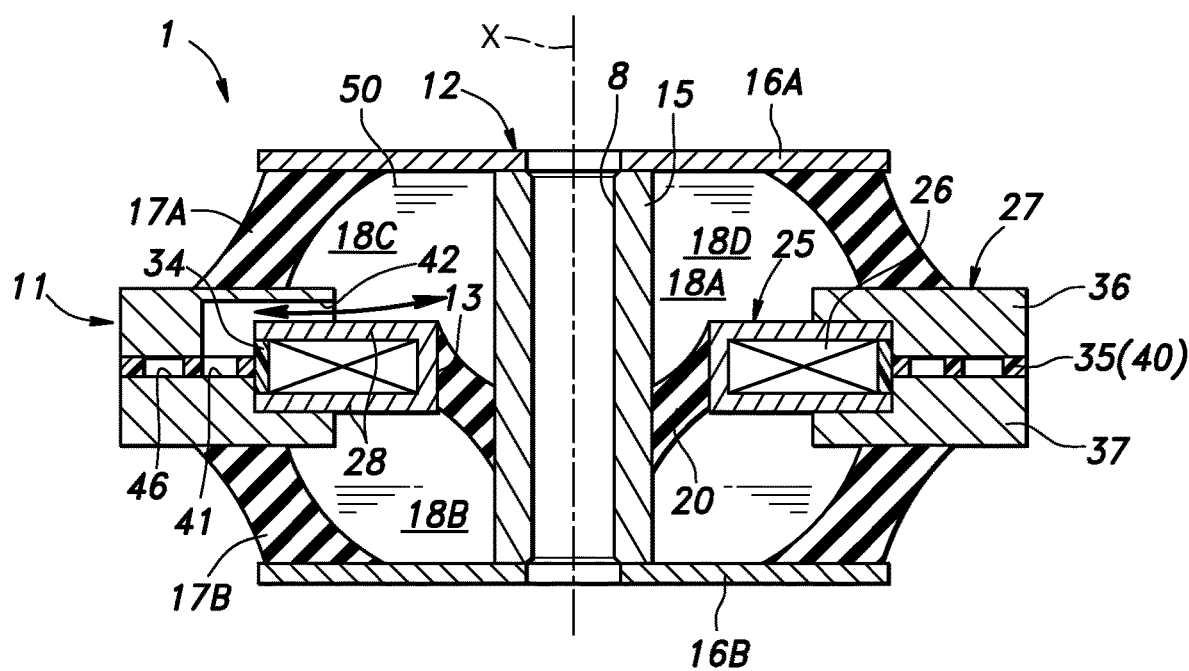
FIG. 6 is a sectional view taken along a line VI-VI of FIG. 3.
Figure 7:
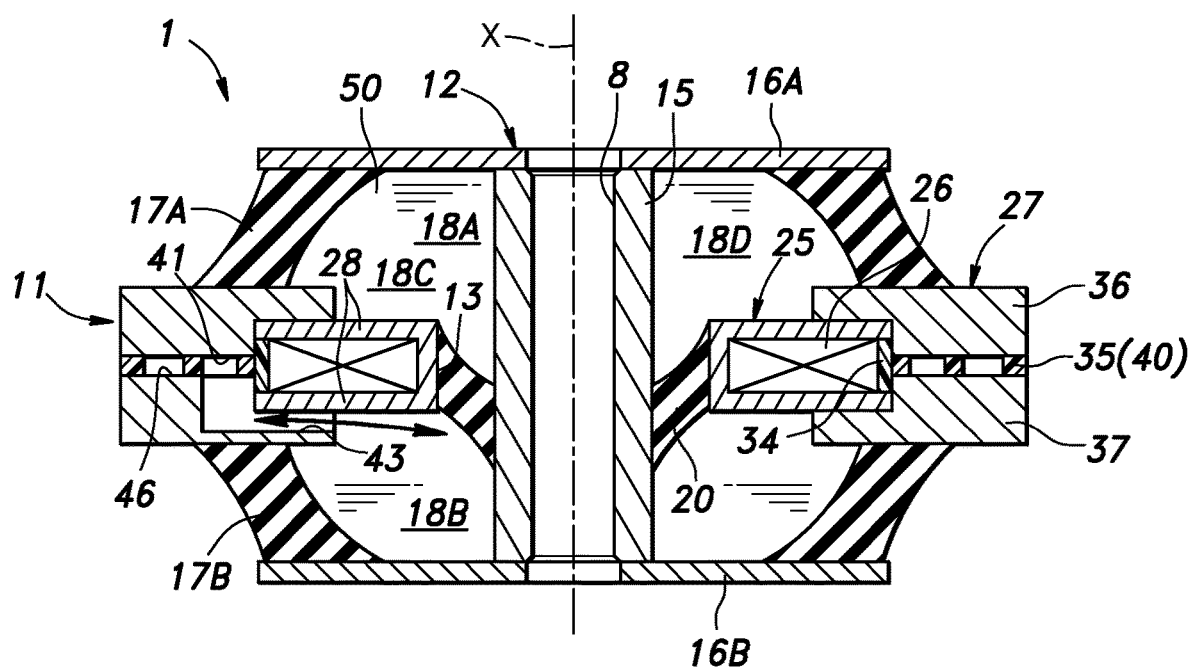
FIG. 7 is a sectional view taken along a line VII-VII of FIG. 3.

As shown in FIGS. 3, 6 and 7, a first communication port 42 is provided at one end of the first circumferential passage 41. The first communication port 42 is formed in the upper outer yoke 36 such that the first circumferential passage 41 and the first liquid chamber 18A (specifically, the third liquid chamber 18C on the front side) communicate with each other via the first communication port 42. A second communication port 43 is provided at another end of the first circumferential passage 41. The second communication port 43 is formed in the lower outer yoke 37 such that the first circumferential passage 41 and the second liquid chamber 18B communicate with each other via the second communication port 43. The first circumferential passage 41, the first communication port 42, and the second communication port 43 compose a first communication passage 44 via which the first liquid chamber 18A and the second liquid chamber 18B communicate with each other. The first communication passage 44 is formed in the outer yoke 27 of the first support member 11. The magnetic gap 40 formed in the outer yoke 27 by the outer passage forming member 35 includes a portion (gap) overlapping with the first circumferential passage 41.

As shown in FIG. 3, the outer passage forming member 35 forms a second circumferential passage 46 in an outer circumferential portion thereof. The second circumferential passage 46 is formed in an outer circumferential side of the first circumferential passage 41. The second circumferential passage 46 extends in the circumferential direction for an angle larger than 180° and smaller than 360°. In the present embodiment, the second circumferential passage 46 extends in the circumferential direction for about 340° (an angle smaller than 360°). The second circumferential passage 46 consists of a slot penetrating through the outer passage forming member 35.

Figure 8:
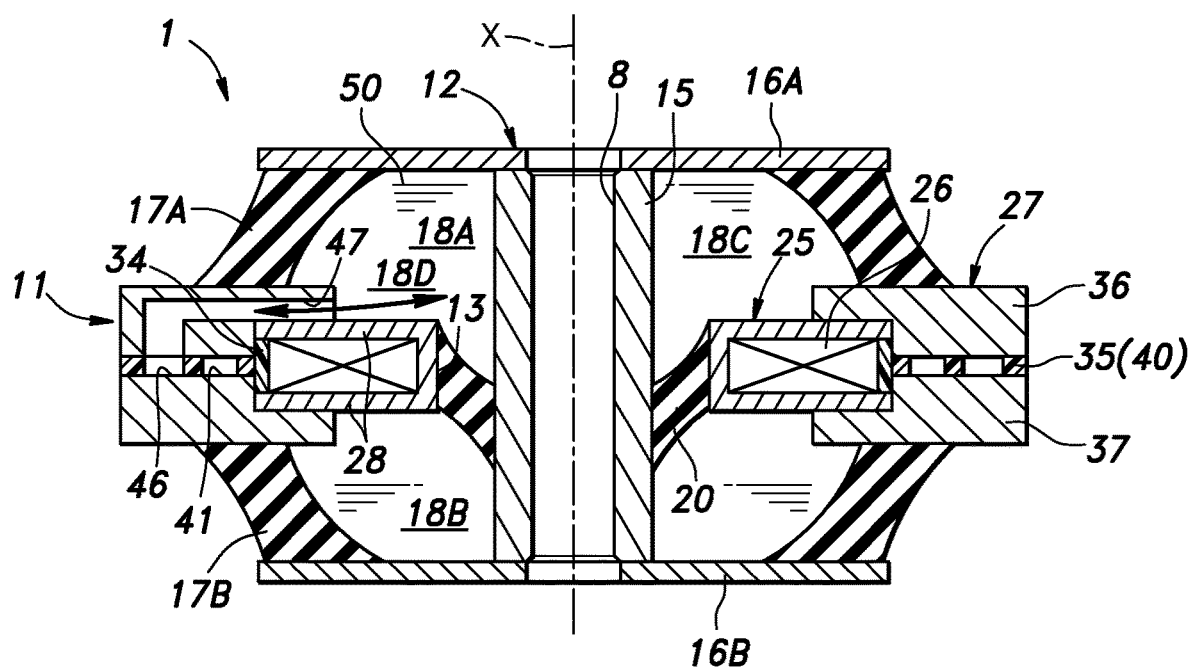
FIG. 8 is a sectional view taken along a line VIII-VIII of FIG. 3.
Figure 9:
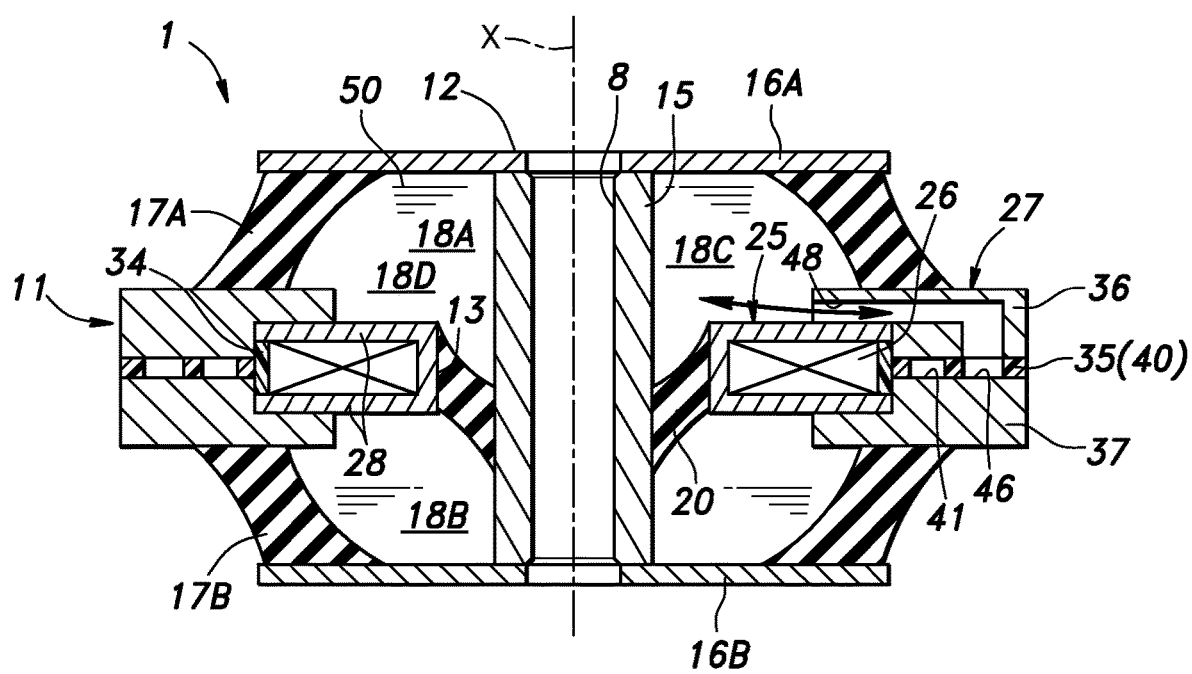
FIG. 9 is a sectional view taken along a line IX-IX of FIG. 3.

As shown in FIGS. 3, 8 and 9, a third communication port 47 is provided at one end of the second circumferential passage 46. The third communication port 47 is formed in the upper outer yoke 36 such that the second circumferential passage 46 and the third liquid chamber 18D on the rear side communicate with each other via the third communication port 47. A fourth communication port 48 is provided at another end of the second circumferential passage 46. The fourth communication port 48 is formed in the upper outer yoke 36 such that the second circumferential passage 46 and the third liquid chamber 18C on the front side communicate with each other via the fourth communication port 48. The second circumferential passage 46, the third communication port 47, and the fourth communication port 48 compose a second communication passage 49 via which the pair of third liquid chambers 18C, 18D communicate with each other. The second communication passage 49 is formed in the outer yoke 27 of the first support member 11. The magnetic gap 40 formed in the outer yoke 27 by the outer passage forming member 35 includes a portion (gap) overlapping with the second circumferential passage 46.

In other embodiments, the second circumferential passage 46 may extend in the circumferential direction for an angle other than about 340° (for example about 330°). In other embodiments, the second circumferential passage 46 may consist of a bottomed groove formed on an upper face of the outer passage forming member 35.

The first liquid chamber 18A (the pair of third liquid chambers 18C, 18D), the second liquid chamber 18B, the first communication passage 44, and the second communication passage 49 are filled with a magnetic fluid 50. The magnetic fluid 50 is an incompressible fluid containing iron particles dispersed in a solvent such as an oil, and preferably consists of a magneto-rheological fluid (MRF) or a magneto-rheological compound (MRC) that can change viscoelasticity (particularly, viscosity) depending on an applied magnetic field. In the present embodiment, the MRC is used as the magnetic fluid 50. When a magnetic field is applied to the magnetic fluid 50, the iron particles therein are aligned along the direction of the magnetic field to form chain-like clusters. Thereby, the chain-like clusters hinder a flow of the solvent in the direction orthogonal to the magnetic field, whereby the viscosity of the magnetic fluid 50 increases and the magnetic fluid 50 is semi-solidified.

Next, operation of the vibration damping device 10 according to the present embodiment will be described. As shown in FIG. 4, when the second support member 12 is displaced vertically with respect to the first support member 11, one of the pair of main elastic members 17 contracts vertically and another of the pair of main elastic members 17 expands vertically. Thus, the volume of the first liquid chamber 18A and that of the second liquid chamber 18B change in an opposite relationship. That is, as the volume of one of the first liquid chamber 18A and the second liquid chamber 18B decreases, the volume of another of the first liquid chamber 18A and the second liquid chamber 18B increases. In response to these changes in the volumes, as shown in FIGS. 6 and 7, the magnetic fluid 50 filling the one of the first liquid chamber 18A and the second liquid chamber 18B moves to another of the first liquid chamber 18A and the second liquid chamber 18B via the first communication passage 44. At the same time, between the pair of third liquid chambers 18C, 18D that compose the first liquid chamber 18A, the magnetic fluid 50 flows in the second communication passage 49. The amount of the magnetic fluid 50 flowing in the second communication passage 49 is about half as much as that of the magnetic fluid 50 flowing in the first communication passage 44. At this time, resistance is applied to the magnetic fluid 50 flowing in the first communication passage 44 and the second communication passage 49, and thereby the vibrations applied to the vibration damping device 10 are damped.

When a voltage is applied to both ends of the coated copper wire composing the coil 26, a magnetic field is generated around the coil 26 by an electric current flowing therethrough. Arrows in the enlarged view of FIG. 4 indicate lines of magnetic force corresponding to the magnetic field generated by the coil 26. A magnetic circuit is formed by the inner yoke 25 and the outer yoke 27 of the first support member 11, and the magnetic fields are formed in the first circumferential passage 41 of the first communication passage 44 and the second circumferential passage 46 of the second communication passage 49.

By applying the magnetic field to the first circumferential passage 41, viscosity of the magnetic fluid 50 in the first communication passage 44 increases. Accordingly, the resistance applied to the magnetic fluid 50 flowing in the first communication passage 44 increases, so that a damping force against vertical vibrations applied to the vibration damping device 10 increases. Also, by increasing the resistance applied to the magnetic fluid 50 flowing in the first communication passage 44, the second support member 12 becomes less likely to move vertically with respect to the first support member 11, so that vertical stiffness of the vibration damping device 10 is increased. As described above, by controlling the voltage applied to the coil 26, the damping force of the vibration damping device 10 against the vertical vibrations can be controlled.

On the other hand, when the second support member 12 is displaced in the fore and aft direction with respect to the first support member 11, the pair of main elastic members 17 are deformed so as to bend in the fore and aft direction. Thereby, the partition elastic member 20 is deformed such that one of the front and rear portions of the partition elastic member 20 contracts in the fore and aft direction and another of the front and rear portions of the partition elastic member 20 expands in the fore and aft direction. At this time, the volumes of the first liquid chamber 18A and the second liquid chamber 18B do not change, and the volumes of the pair of third liquid chambers 18C, 18D change in an opposite relationship. That is, as the volume of one of the third liquid chambers 18C, 18D decreases, the volume of another of the third liquid chambers 18C, 18D increases. In response to these changes in the volumes, as shown in FIGS. 8 and 9, the magnetic fluid 50 filling the one of the third liquid chambers 18C, 18D moves to another of the third liquid chambers 18C, 18D via the second communication passage 49. At this time, resistance is applied to the magnetic fluid 50 flowing in the second communication passage 49, and thereby the vibrations applied to the vibration damping device 10 are damped.

As shown in the enlarged view of FIG. 4, when a voltage is applied to both ends of the coated copper wire composing the coil 26, a magnetic field is generated around the coil 26 by an electric current flowing therethrough. A magnetic circuit is formed by the inner yoke 25 and the outer yoke 27 of the first support member 11, and the magnetic field is formed in the second circumferential passage 46 of the second communication passage 49.

By applying the magnetic field to the second circumferential passage 46, viscosity of the magnetic fluid 50 in the second communication passage 49 increases. Accordingly, the resistance applied to the magnetic fluid 50 flowing in the second communication passage 49 increases, so that a damping force against fore and aft vibrations applied to the vibration damping device 10 increases. Also, by increasing the resistance applied to the magnetic fluid 50 flowing in the second communication passage 49, the second support member 12 becomes less likely to move in the fore and aft direction with respect to the first support member 11, so that fore and aft stiffness of the vibration damping device 10 is increased. As described above, by controlling the voltage applied to the coil 26, the damping force of the vibration damping device 10 against the fore and aft vibrations can be controlled.

Next, the effect of the vibration damping device 10 will be described. The vibration damping device 10 can vary viscosity of the magnetic fluid 50 by supplying an electric current to the coil 26, so that stiffness of the vibration damping device 10 can be varied. To vary stiffness of the vibration damping device 10 effectively, it is desirable that a magnetic field generated in the coil 26 concentrate in a flowing passage of the magnetic fluid 50.

In the present embodiment, as shown in FIG. 4, the coil 26 is wound coaxially with and provided in the first support member 11, and the yoke 38 is provided in the first support member 11 such that the yoke 38 forms the magnetic gap 40 overlapping at least partially (namely, partially or entirely) with the first circumferential passage 41 and the second circumferential passage 46. Accordingly, a magnetic field generated around the coil 26 by supplying an electric current thereto concentrates in the first circumferential passage 41 and the second circumferential passage 46, and flow resistance of the magnetic fluid 50 in the first circumferential passage 41 and the second circumferential passage 46 is varied. Therefore, stiffness (specifically, stiffness related to displacement of the first support member 11 and the second support member 12 in the axial direction) and damping characteristics in the axial direction of the vibration damping device 10 can be varied as desired by an electric current flowing through the coil 26. Also, stiffness (specifically, stiffness related to displacement of the first support member 11 and the second support member 12 in the first radial direction) and damping characteristics in the first radial direction (fore and aft direction) of the vibration damping device 10 can be varied as desired by an electric current flowing through the coil 26. In addition, stiffness and damping characteristics in the axial direction and the first radial direction of the vibration damping device 10 can be varied with a simple configuration by providing the first support member 11 with the first circumferential passage 41, the second circumferential passage 46, the coil 26, and the yoke 38.

As shown in FIGS. 3 and 4, in the present embodiment, the first support member 11 is provided with the first communication passage 44, the second communication passage 49, the coil 26, and the yoke 38. Accordingly, it is possible to lengthen the first circumferential passage 41 and the second circumferential passage 46, compared with a case where the axial portion 15 of the second support member 12 is provided with these members. Therefore, stiffness and damping characteristics in the axial direction and the first radial direction of the vibration damping device 10 can be varied greatly.

As shown in FIG. 3, in the present embodiment, the first circumferential passage 41 and the second circumferential passage 46 are provided in the first support member 11 in a circumferential range larger than 180°. Accordingly, it is possible to lengthen the first circumferential passage 41 and the second circumferential passage 46, and therefore, stiffness and damping characteristics in the axial direction and the first radial direction of the vibration damping device 10 can be varied more greatly.

In the present embodiment, the first circumferential passage 41 and the second circumferential passage 46 are located on an outer circumferential side of the coil 26. Accordingly, it is possible to lengthen the first circumferential passage 41 and the second circumferential passage 46, and therefore, stiffness and damping characteristics in the axial direction and the first radial direction of the vibration damping device 10 can be varied more greatly.

In the present embodiment, the axial portion 15 has the bolt hole 8 that consists of a through hole penetrating therethrough in the axial direction. Accordingly, it is possible to fasten either the power plant 5 on a vibration source side or the vehicle body 2 on a vibration receiving side to the pair of outer flanges 16 of the second support member 12 via a fastening means such as the bolt 9 penetrating through the bolt hole 8. Also, it is possible to utilize the vibration damping device 10 as a bushing.

Figure 10A:
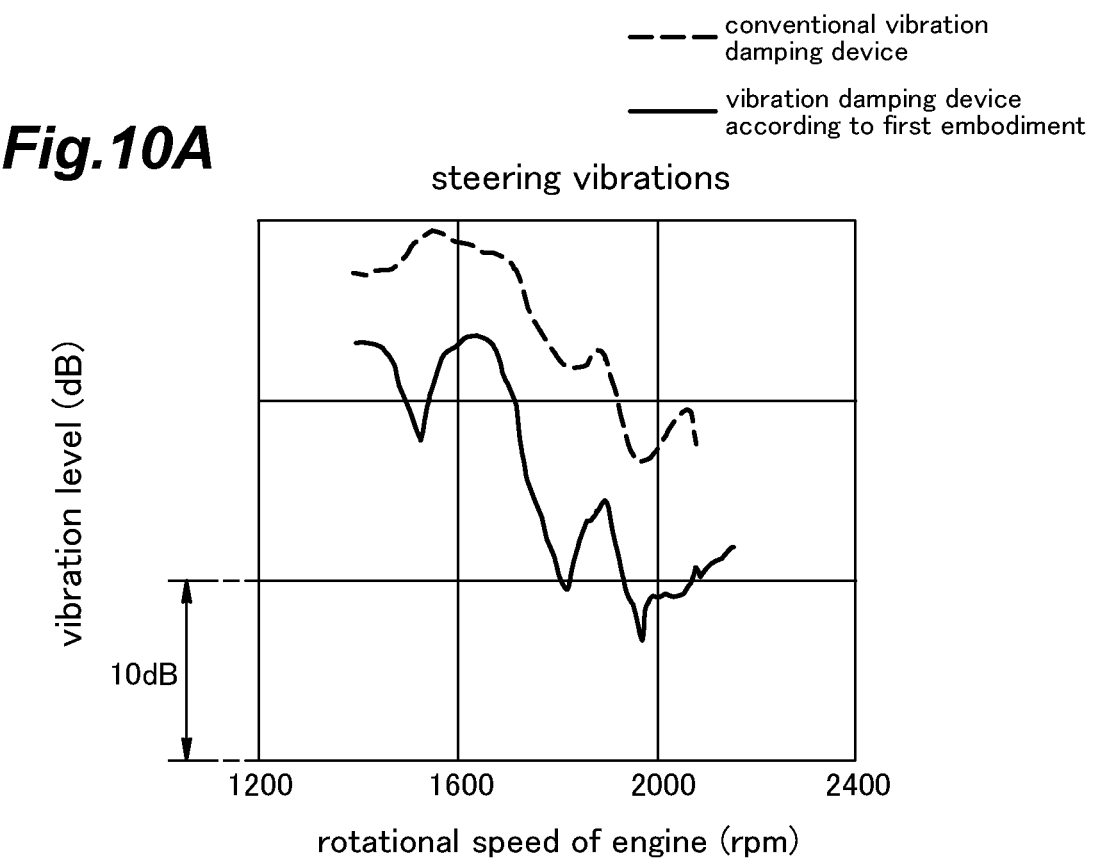
FIG. 10A is a graph showing a vibration level of steering vibrations.
Figure 10B:
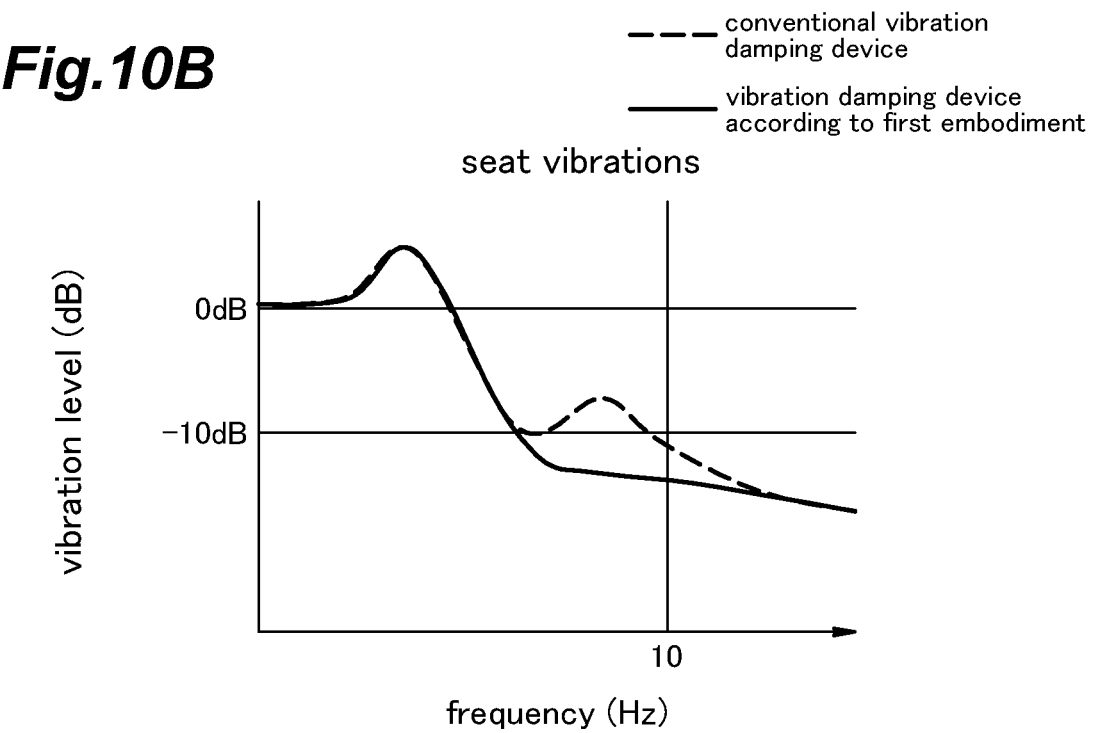
FIG. 10B is a graph showing a vibration level of seat vibrations.

FIGS. 10A and 10B are graphs each showing a vibration level depending on a control state of the vibration damping device 10 according to the first embodiment, which is used as the engine mount. FIG. 10A shows a vibration level of steering vibrations (vibrations generated in a steering wheel) during acceleration of the automobile 1. FIG. 10B shows a vibration level (displacement gain of a road surface) of seat vibrations (vibrations generated in a seat) during acceleration of the automobile 1. In FIGS. 10A and 10B, the vertical axis of the graph represents a vibration level. In FIG. 10A, the horizontal axis of the graph represents a rotational speed of an engine. In FIG. 10B, the horizontal axis of the graph represents a frequency.

As shown in FIG. 10A, with regard to the vibrations generated in the steering wheel during acceleration of the automobile 1, the vibration level is reduced over an entire normal use range of the rotational speed of the engine in a case where the vibration damping device 10 according to the first embodiment is used in a low stiffness state, compared with a case where a conventional vibration damping device with high stiffness is used. Also, as shown in FIG. 10B, with regard to the vibrations generated in the seat during acceleration of the automobile 1, the vibration level is reduced in a frequency range around 10 Hz in a case where the vibration damping device 10 according to the first embodiment is used in a low stiffness state, compared with a case where a conventional vibration damping device with high stiffness is used.

Second Embodiment

Next, a second embodiment of the present invention will be described with reference to FIGS. 11 to 14. Elements of the second embodiment that are the same as or similar to those of the first embodiment are given the same reference numerals as the first embodiment, and descriptions of the second embodiment that may duplicate those of the first embodiment are omitted. In the second embodiment, configurations around the coil 26 are different from those in the first embodiment. In the following, the second embodiment will be specifically described.

Figure 11:
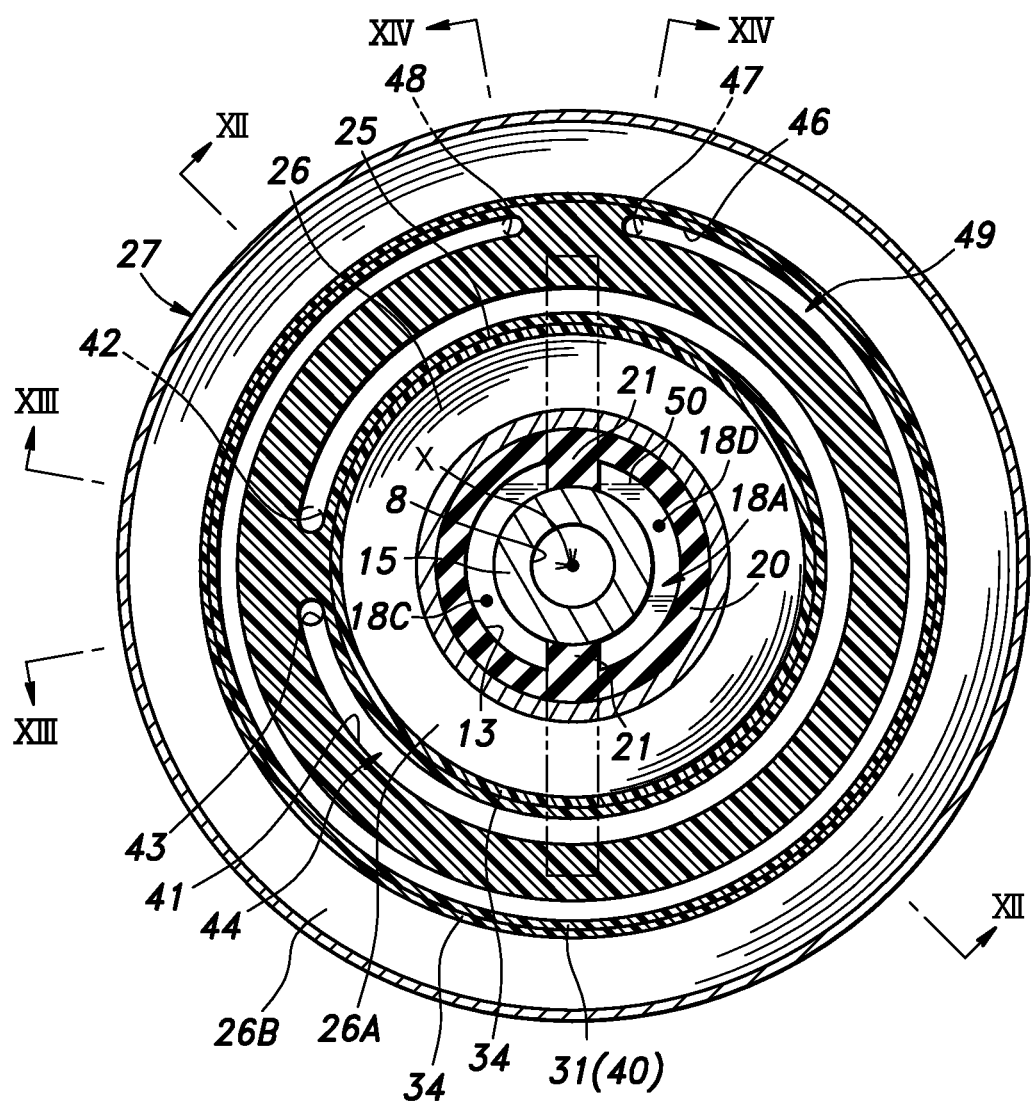
FIG. 11 is a sectional view, in a section corresponding to FIG. 3, of a variable stiffness vibration damping device according to a second embodiment of the present invention.
Figure 12:
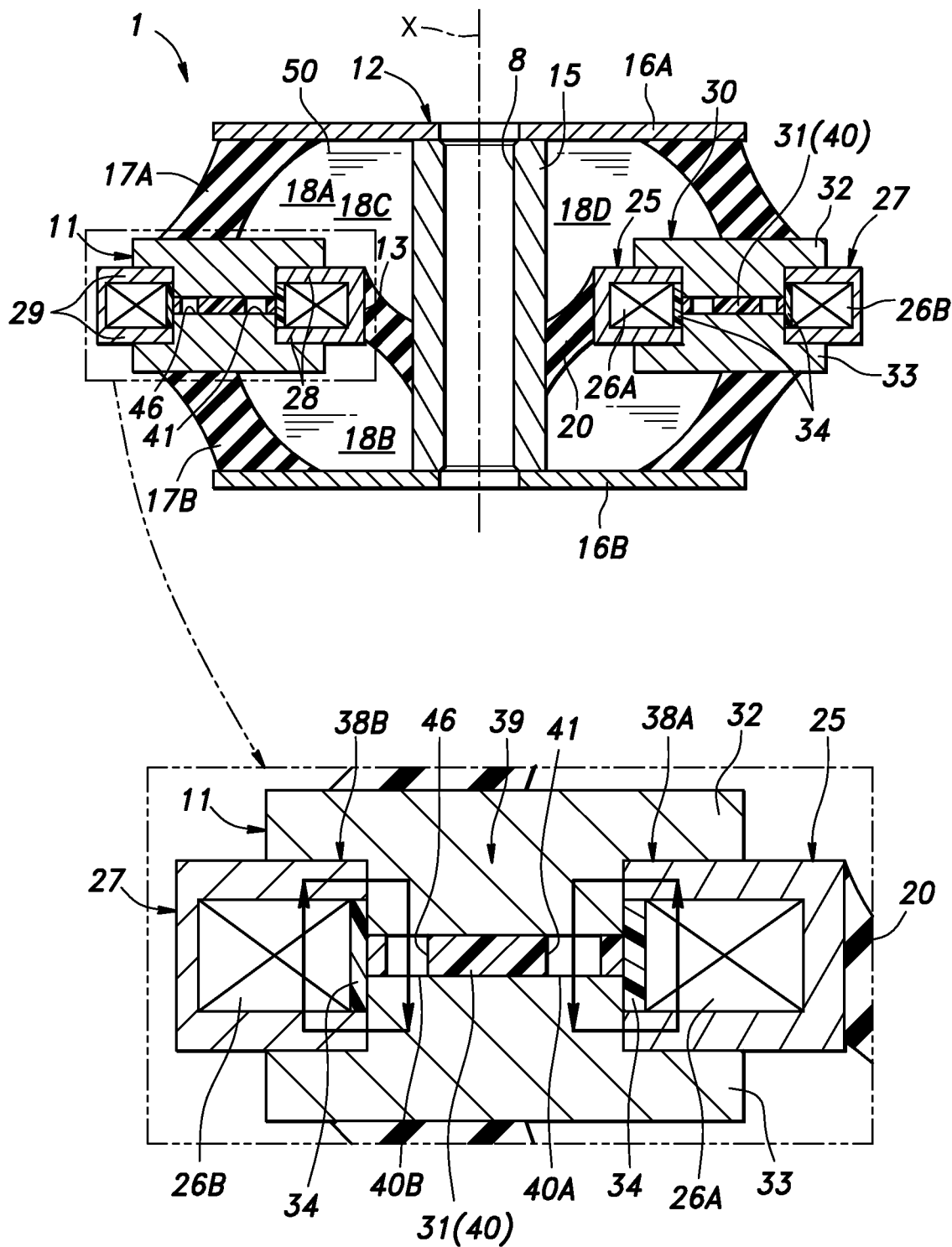
FIG. 12 is a sectional view taken along a line XII-XII of FIG. 11.

FIG. 11 is a sectional view, in a section corresponding to FIG. 3, of a vibration damping device 10 according to the present embodiment. As shown in FIGS. 11 and 12, the first support member 11 includes an annular inner yoke 25, an annular outer yoke 27, and an annular intermediate yoke 30. The inner yoke 25 is provided in an inner circumferential portion of the first support member 11. The outer yoke 27 is provided in an outer circumferential portion of the first support member 11. The intermediate yoke 30 is located so as to overlap with the inner yoke 25 and the outer yoke 27. A first coil 26A is wound coaxially with and provided in the inner yoke 25 and a second coil 26B is wound coaxially with and provided in the outer yoke 27. An inner diameter of the second coil 26B located outside is larger than an outer diameter of the first coil 26A located inside.

A pair of outer flange portions 28 that accommodate the first coil 26A are formed integrally with upper and lower ends of the inner yoke 25 and a pair of inner flange portions 29 that accommodate the second coil 26B are formed integrally with upper and lower ends of the outer yoke 27. The pair of outer flange portions 28 and the pair of inner flange portions 29 compose an upper yoke and a lower yoke. A pair of spacers 34 are provided on an outer circumferential side of the first coil 26A and an inner circumferential side of the second coil 26B. Upper and lower ends of each spacer 34 abut against the pair of outer flange portions 28 or the pair of inner flange portions 29 corresponding to each spacer 34.

The intermediate yoke 30 includes an intermediate passage forming member 31, an upper intermediate yoke 32, and a lower intermediate yoke 33. The intermediate passage forming member 31 is located between the first coil 26A and the second coil 26B. The upper intermediate yoke 32 and the lower intermediate yoke 33 are stacked in the axial direction with the intermediate passage forming member 31 therebetween. The upper intermediate yoke 32 and the lower intermediate yoke 33 are joined to the intermediate passage forming member 31 in a state where an outer circumferential portion of the inner yoke 25 and an inner circumferential portion of the outer yoke 27 are interposed between the upper intermediate yoke 32 and the lower intermediate yoke 33. Thereby, the intermediate yoke 30 is coupled to the inner yoke 25 and the outer yoke 27.

As shown in the enlarged view of FIG. 12, the intermediate yoke 30 forms a first yoke 38A surrounding the first coil 26A in cooperation with the inner yoke 25, and forms a second yoke 38B surrounding the second coil 26B in cooperation with the outer yoke 27. The intermediate yoke 30 forms a common yoke 39 that composes a common portion of the first yoke 38A and the second yoke 38B between the first coil 26A and the second coil 26B. By the intermediate passage forming member 31 of the intermediate yoke 30, a first magnetic gap 40A is formed in the first yoke 38A and a second magnetic gap 40B is formed in the second yoke 38B.

Figure 13:
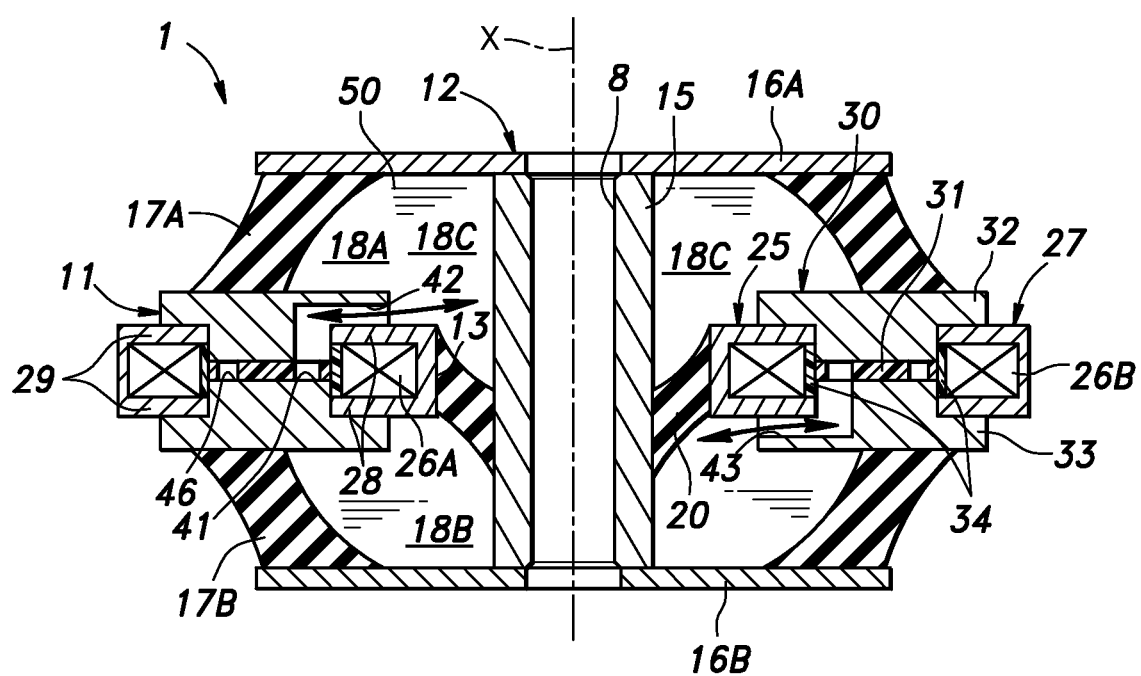
FIG. 13 is a sectional view taken along a line XIII-XIII of FIG. 11.
Figure 14:
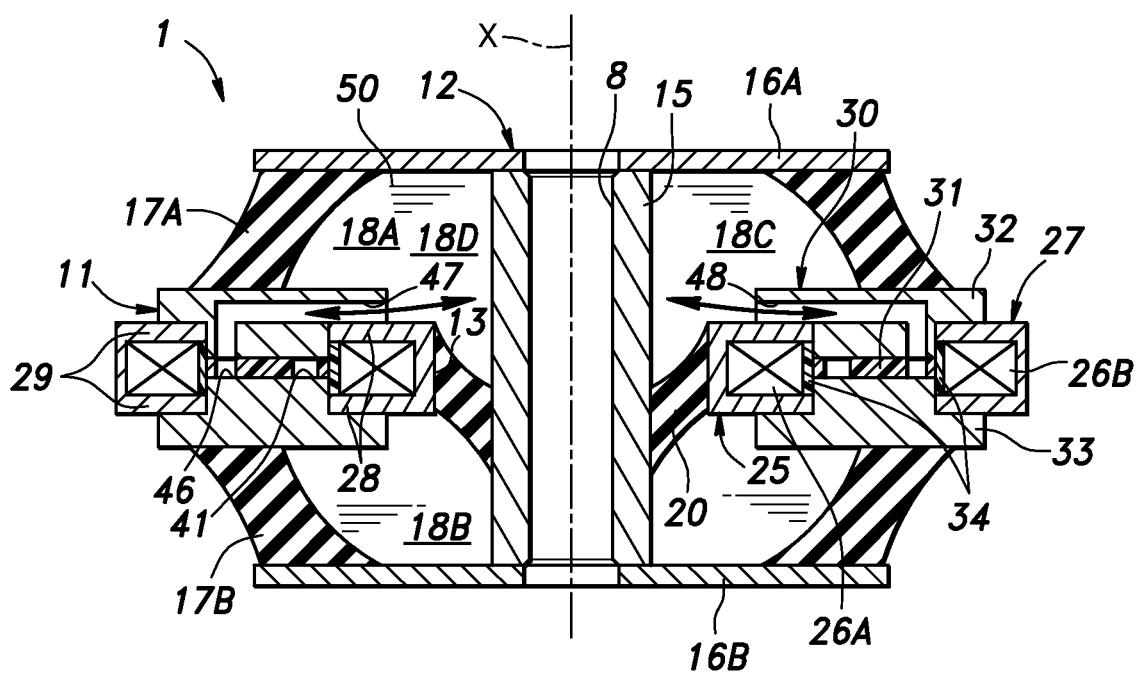
FIG. 14 is a sectional view taken along a line XIV-XIV of FIG. 11.

As shown in FIGS. 11 and 13, the first circumferential passage 41 of the first communication passage 44 is formed in an inner circumferential portion of the intermediate passage forming member 31. As shown in FIGS. 11 and 14, the second circumferential passage 46 of the second communication passage 49 is formed in an outer circumferential portion of the intermediate passage forming member 31. The first communication port 42 of the first communication passage 44 and the third communication port 47 and the fourth communication port 48 of the second communication passage 49 are formed in the upper intermediate yoke 32. The second communication port 43 of the first communication passage 44 is formed in the lower intermediate yoke 33.

A voltage is individually applied to each of the first coil 26A and the second coil 26B. Thereby, an electric current is supplied to each of the first coil 26A and the second coil 26B such that magnetic fields in opposite directions are generated around the first coil 26A and the second coil 26B.

As shown in the enlarged view of FIG. 12, when a voltage is applied to the first coil 26A, a magnetic field is generated around the first coil 26A by an electric current flowing therethrough. Thereby, the first yoke 38A that surrounds the first coil 26A forms a magnetic circuit, so that the magnetic field concentrates in the first circumferential passage 41 of the first communication passage 44. By applying the magnetic field to the first circumferential passage 41, viscosity of the magnetic fluid 50 in the first communication passage 44 increases. Accordingly, as shown in FIG. 13, the resistance applied to the magnetic fluid 50 flowing in the first communication passage 44 increases, so that a damping force against vertical vibrations applied to the vibration damping device 10 increases.

When a voltage is applied to the second coil 26B, a magnetic field is generated around the second coil 26B by the electric current flowing therethrough. Thereby, the second yoke 38B that surrounds the second coil 26B forms a magnetic circuit, so that the magnetic field concentrates in the second circumferential passage 46 of the second communication passage 49. By applying the magnetic field to the second circumferential passage 46, viscosity of the magnetic fluid 50 in the second communication passage 49 increases. Accordingly, as shown in FIG. 14, the resistance applied to the magnetic fluid 50 flowing in the second communication passage 49 increases, so that a damping force against fore and aft vibrations applied to the vibration damping device 10 increases.

As described above, in the present embodiment, the coil 26 includes: the first coil 26A adjacent to the first circumferential passage 41; and the second coil 26B adjacent to the second circumferential passage 46. Also, the yoke 38 includes: the first yoke 38A configured to form the first magnetic gap 40A at least partially (namely, partially or entirely) overlapping with the first circumferential passage 41; and the second yoke 38B configured to form the second magnetic gap 40B at least partially (namely, partially or entirely) overlapping with the second circumferential passage 46. Accordingly, it is possible to individually vary stiffness and damping characteristics in the axial direction of the vibration damping device 10 and stiffness and damping characteristics in the first radial direction thereof by electric currents supplied to the first coil 26A and the second coil 26B.

Also, in the present embodiment, the second coil 26B is located on an outer circumferential side of the first coil 26A, and the first circumferential passage 41 and the second circumferential passage 46 are located between the first coil 26A and the second coil 26B. Accordingly, it is possible to form the first magnetic gap 40A and the second magnetic gap 40B by a common member (intermediate passage forming member 31), so that a configuration of the vibration damping device 10 can be simplified.

Also, the first yoke 38A and the second yoke 38B include the common yoke 39 as a portion common to each other, so that the vibration damping device 10 can be downsized. On the other hand, the first coil 26A and the second coil 26B generate magnetic fields in directions opposite to each other. Accordingly, a magnetic field generated in the first yoke 38A by supplying an electric current to the first coil 26A and a magnetic field generated in the second yoke 38B by supplying an electric current to the second coil 26B are not weakened due to interference thereof.

Another Embodiment

Next, another embodiment of the present invention will be described with reference to FIGS. 15 to 17. Elements of the present embodiment that are the same as or similar to those of the second embodiment are given the same reference numerals as the second embodiment, and descriptions of the present embodiment that may duplicate those of the second embodiment are omitted. In the present embodiment, configurations around the coil 26 are different from those in the second embodiment. In the following, the present embodiment will be specifically described.

Figure 15:
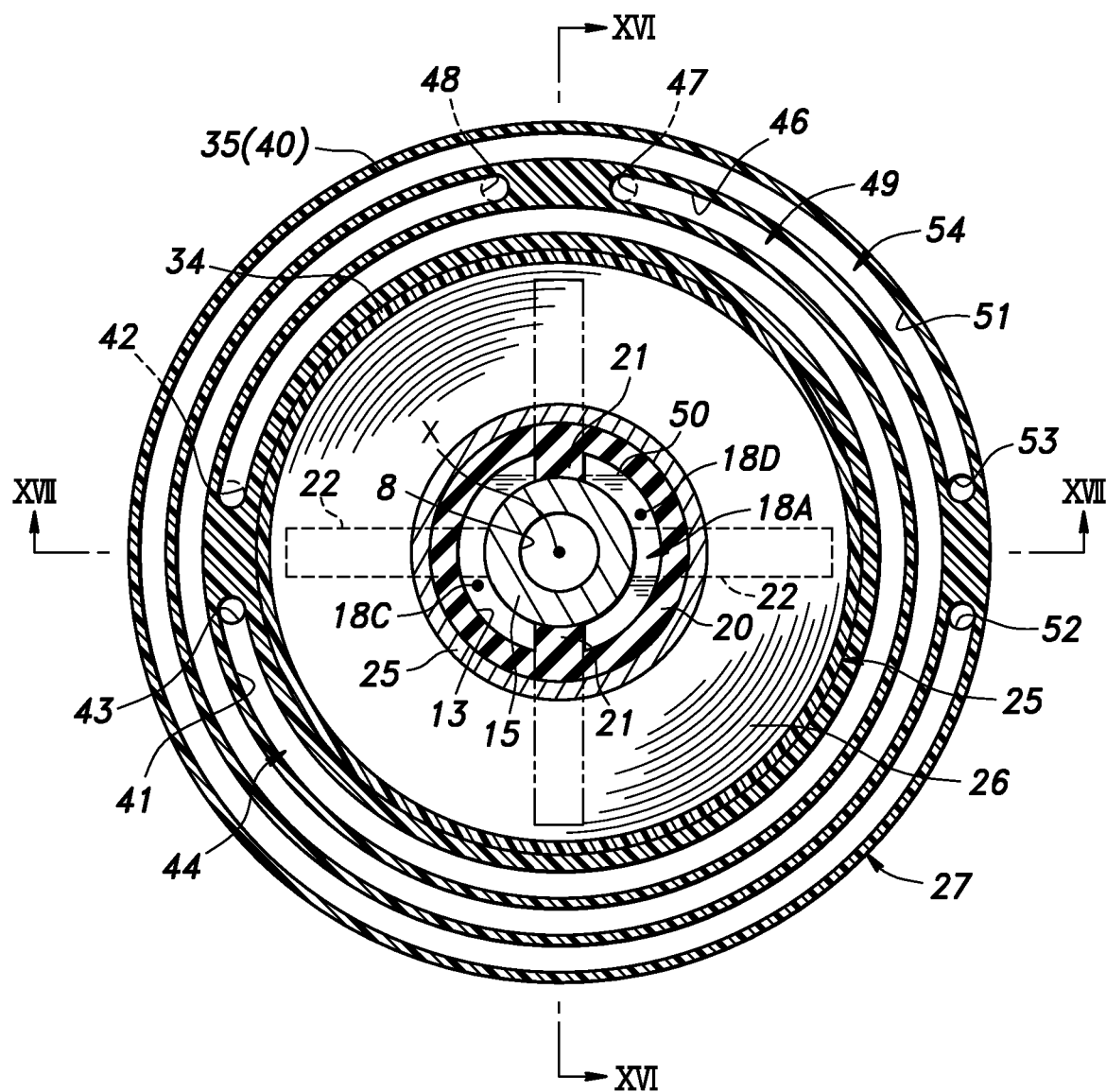
FIG. 15 is a sectional view, in a section corresponding to FIG. 3, of a variable stiffness vibration damping device according to another embodiment of the present invention.

FIG. 15 is a sectional view, in a section corresponding to FIG. 3, of the vibration damping device 10 according to the present embodiment. FIG. 16 is a sectional view taken along a line XVI-XVI of FIG. 15. FIG. 17 is a sectional view taken along a line XVII-XVII of FIG. 15. As shown in FIGS. 15 and 16, the pair of first radial walls 21 are formed in the first liquid chamber 18A. The pair of first radial walls 21 are made of elastic materials and partition the first liquid chamber 18A into the pair of third liquid chambers 18C, 18D opposed to each other in the first radial direction (fore and aft direction) with the axial portion 15 therebetween. On the other hand, as shown in FIGS. 15 and 17, a pair of second radial walls 22 are formed in the second liquid chamber 18B.

The pair of second radial walls 22 are made of elastic materials and partition the second liquid chamber 18B into a pair of fourth liquid chambers 18E, 18F opposed to each other in the second radial direction (lateral direction) crossing the first radial direction with the axial portion 15 therebetween. That is, the pair of fourth liquid chambers 18E, 18F opposed to each other in the second radial direction with the axial portion 15 therebetween are partitioned from each other in the circumferential direction by the pair of second radial walls 22. Phases of the pair of fourth liquid chambers 18E, 18F are different from each other by 180°. In the present embodiment, the pair of fourth liquid chambers 18E, 18F are opposed to each other in the lateral direction. An inner end of each second radial wall 22 is connected to an outer circumferential face of the axial portion 15, a lower end of each second radial wall 22 is connected to an upper face of the lower outer flange 16B, and an upper portion of each second radial wall 22 is connected to a lower face and an inner circumferential face of the first support member 11. The pair of second radial walls 22 are formed integrally with the lower main elastic member 17B and the partition elastic member 20.

As shown in FIG. 15, the first circumferential passage 41 of the first communication passage 44 is formed in an inner circumferential portion of the outer passage forming member 35, the second circumferential passage 46 of the second communication passage 49 is formed in an intermediate portion of the outer passage forming member 35, and a third circumferential passage 51 of a third communication passage 54 is formed in an outer circumferential portion of the outer passage forming member 35. One end in the circumferential direction of the third circumferential passage 51 communicates with the fourth liquid chamber 18E on the left side via a fifth communication port 52. Another end in the circumferential direction of the third circumferential passage 51 communicates with the fourth liquid chamber 18F on the right side via a sixth communication port 53. The fifth communication port 52 and the sixth communication port 53 of the third communication passage 54 is formed in the lower outer yoke 37.

Figure 16:
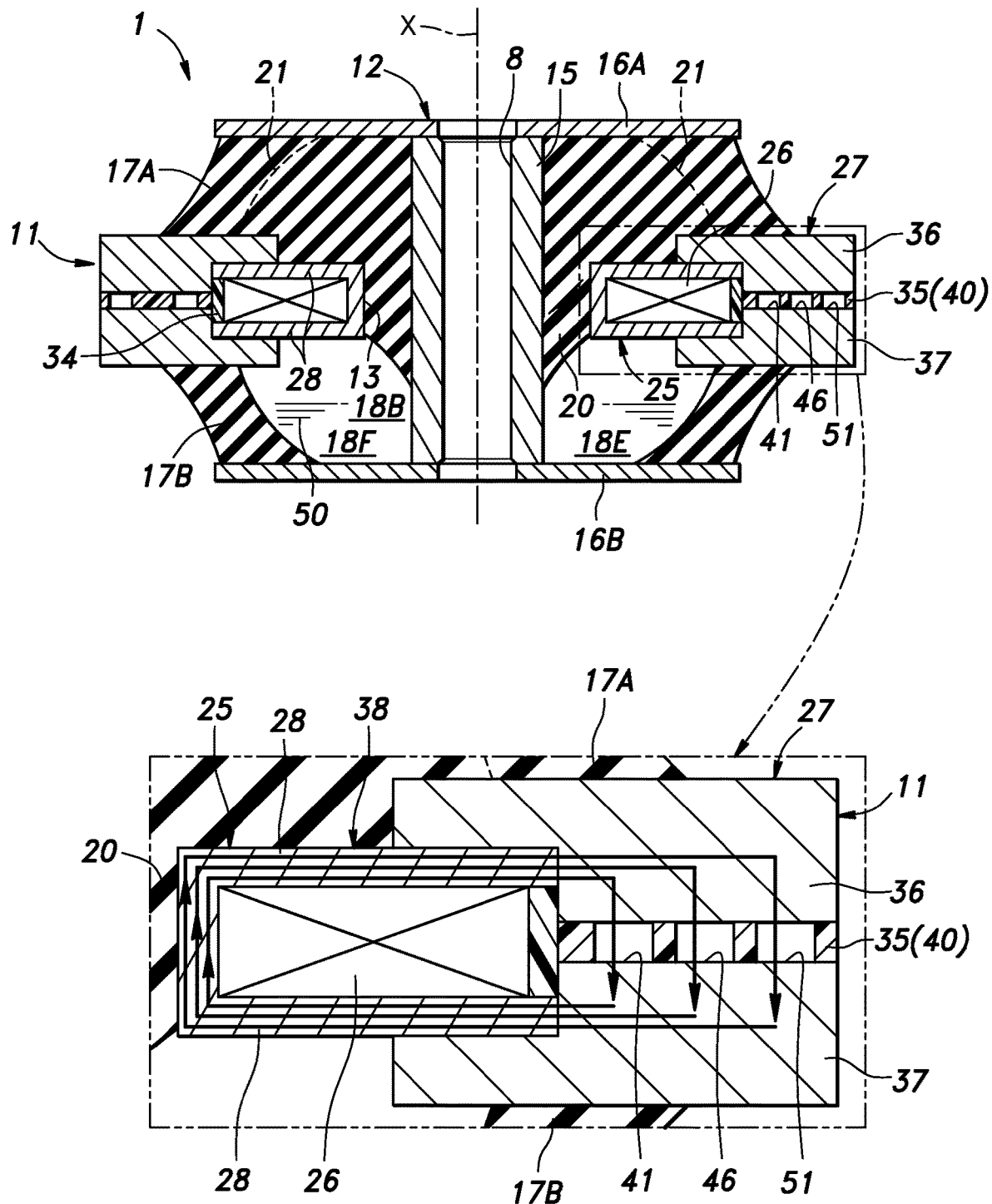
FIG. 16 is a sectional view taken along a line XVI-XVI of FIG. 15.
Figure 17:
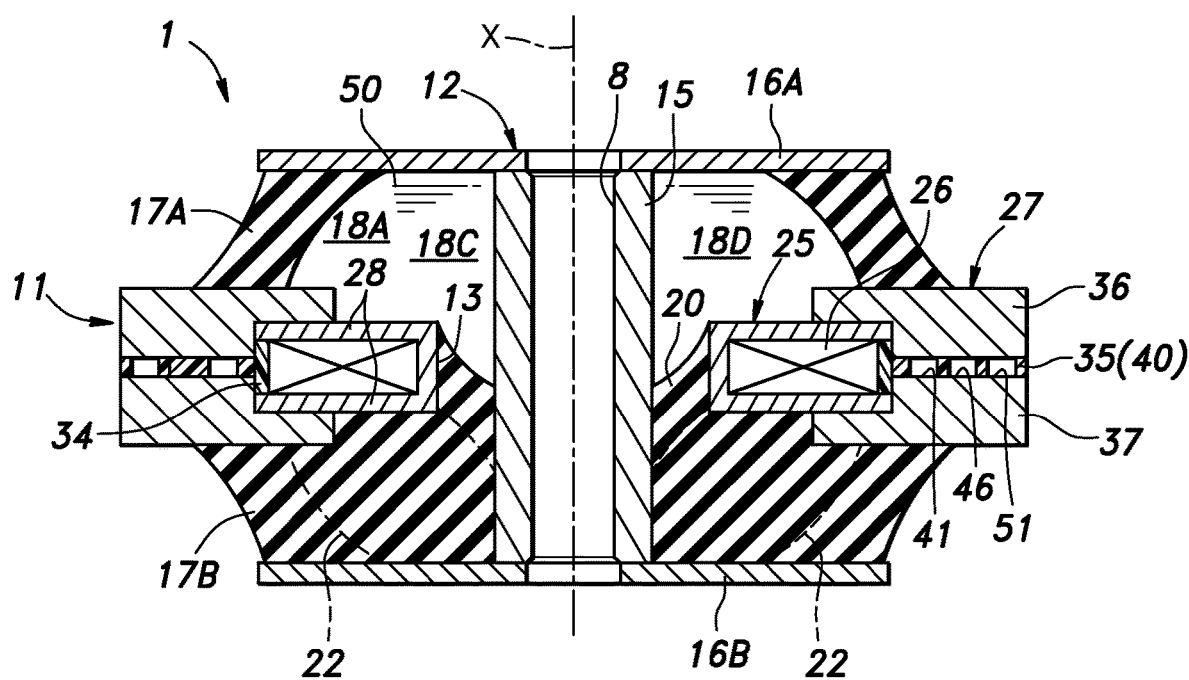
FIG. 17 is a sectional view taken along a line XVII-XVII of FIG. 15.

As shown in the enlarged view of FIG. 16, when a voltage is applied to the coil 26, a magnetic field is generated around the coil 26 by an electric current flowing therethrough. A magnetic circuit is formed by the inner yoke 25 and the outer yoke 27 of the first support member 11, and the magnetic fields are formed in the first circumferential passage 41 of the first communication passage 44, the second circumferential passage 46 of the second communication passage 49, and the third circumferential passage 51 of the third communication passage 54. By applying the magnetic fields to not only the first circumferential passage 41 and the second circumferential passage 46 but also the third circumferential passage 51, the resistance applied to the magnetic fluid 50 flowing in the third circumferential passage 51 increases. Thereby, it is possible to increase a damping force generated by the vibration damping device 10 against not only vertical vibrations and fore and aft vibrations but also lateral vibrations.

As described above, in the present embodiment, the pair of second radial walls 22 partition the second liquid chamber 18B into the pair of fourth liquid chambers 18E, 18F opposed to each other in the second radial direction (lateral direction) crossing the first radial direction (fore and aft direction) with the axial portion 15 therebetween. Also, the third communication passage 54 is provided in the first support member 11 such that the pair of fourth liquid chambers 18E, 18F communicate with each other via the third communication passage 54. The third communication passage 54 includes the third circumferential passage 51 extending in the circumferential direction, and the magnetic gap 40 overlaps at least partially (namely, partially or entirely) with the third circumferential passage 51. Accordingly, in not only the axial direction and the first radial direction but also the second radial direction, it is possible to vary stiffness and damping characteristics of the vibration damping device 10 as desired by an electric current supplied to the coil 26.

In the present embodiment, similar to the second embodiment, the coil 26 may include the first coil 26A and the second coil 26B that are divided from each other in the radial direction. According to such a configuration, it is possible to individually control the voltages applied to the first coil 26A and the second coil 26B and thereby to individually control the stiffness and damping characteristics of the vibration damping device 10 in plural directions.

Concrete embodiments of the present invention have been described in the foregoing, but the present invention should not be limited by the foregoing embodiments and various modifications and alterations are possible within the scope of the present invention. For example, in the above embodiments, the entirety of the first support member 11 composes the yoke 38. On the other hand, in other embodiments, the yoke 38 may be provided in any portion of the first support member 11 or the axial portion 15 of the second support member 12. Thus, the first support member 11 or the axial portion 15 of the second support member 12 may include a portion made of a metal having low magnetic permeability. Also, in other embodiments, the coil 26, the first communication passage 44 including the first circumferential passage 41, the second communication passage 49 including the second circumferential passage 46, and the like may be provided not in the first support member 11 but in the axial portion 15 of the second support member 12. Further, in the above embodiments, the vibration damping devices 10 are used as the engine mounts in an engine support portion of the automobile 1, i.e. a vibration generating portion of the automobile 1. On the other hand, in other embodiments, the vibration damping device 10 can be applied to various portions that generate vibrations, for example, a motor support portion of the automobile 1, a suspension of the automobile 1, or a vibration generating portion of the device other than the automobile 1. In addition, a specific configuration, an arrangement, quantity, an angle, and the like of each member and each portion thereof shown in the above embodiments can be changed as appropriate within the scope of the present invention. Further, not all of the structural elements shown in the above embodiments are necessarily indispensable and they may be selectively adopted as appropriate. Also, the structures of the above embodiments may be combined as appropriate.

The invention claimed is:

1. A variable stiffness vibration damping device, comprising:
   an annular first support member defining an inner hole therein;
   a second support member including an axial portion penetrating through the inner hole of the first support member in an axial direction and a pair of outer flanges provided at both ends in the axial direction of the axial portion and spaced from the first support member at a prescribed interval in the axial direction;
   a pair of annular main elastic members connecting the first support member and each of the pair of outer flanges and defining a liquid chamber around the axial portion;
   an annular partition elastic member connecting an inner circumferential portion of the first support member and an outer circumferential portion of the axial portion and partitioning the liquid chamber into a first liquid chamber and a second liquid chamber;
   a first communication passage provided in one of the first support member and the axial portion such that the first liquid chamber and the second liquid chamber communicate with each other via the first communication passage, the first communication passage including a first circumferential passage extending in a circumferential direction;
   a pair of first radial walls made of elastic materials and partitioning one of the first liquid chamber and the second liquid chamber into a pair of third liquid chambers opposed to each other in a first radial direction with the axial portion therebetween;
   a second communication passage provided in the one of the first support member and the axial portion such that the pair of third liquid chambers communicate with each other via the second communication passage, the second communication passage including a second circumferential passage extending in the circumferential direction;
   at least one coil wound coaxially with and provided in the one of the first support member and the axial portion;
   a yoke included in the one of the first support member and the axial portion and configured to form a magnetic gap overlapping at least partially with the first circumferential passage and the second circumferential passage;
   a magnetic fluid filling the first liquid chamber, the second liquid chamber, the first communication passage, and the second communication passage;
   a pair of second radial walls made of elastic materials and partitioning another of the first liquid chamber and the second liquid chamber into a pair of fourth liquid chambers opposed to each other in a second radial direction crossing the first radial direction with the axial portion therebetween; and
   a third communication passage provided in the one of the first support member and the axial portion such that the pair of fourth liquid chambers communicate with each other via the third communication passage, the third communication passage including a third circumferential passage extending in the circumferential direction, and
   the magnetic gap overlaps at least partially with the third circumferential passage.

2. The variable stiffness vibration damping device according to claim 1, wherein the first support member is provided with the first communication passage, the second communication passage, the at least one coil, and the yoke.

3. The variable stiffness vibration damping device according to claim 1, wherein the first circumferential passage and the second circumferential passage are provided in the first support member in a circumferential range larger than 180°.

4. The variable stiffness vibration damping device according to claim 1, wherein the first circumferential passage and the second circumferential passage are located on an outer circumferential side of the at least one coil.

5. The variable stiffness vibration damping device according to claim 1, wherein the at least one coil includes:

a first coil adjacent to the first circumferential passage; and
a second coil adjacent to the second circumferential passage, and
the yoke includes:
a first yoke configured to form a first magnetic gap at least partially overlapping with the first circumferential passage; and
a second yoke configured to form a second magnetic gap at least partially overlapping with the second circumferential passage.

6. The variable stiffness vibration damping device according to claim 5, wherein one of the first coil and the second coil is located on an outer circumferential side of another of the first coil and the second coil, and
the first circumferential passage and the second circumferential passage are located between the first coil and the second coil.

7. The variable stiffness vibration damping device according to claim 5, wherein the first yoke and the second yoke include a portion common to each other, and
the first coil and the second coil are configured to generate magnetic fields in directions opposite to each other.

8. The variable stiffness vibration damping device according to claim 1, wherein the axial portion has a through hole penetrating therethrough in the axial direction.

9. The variable stiffness vibration damping device according to claim 1, wherein the partition elastic member is located at least partially in the inner hole of the first support member and extends in a direction substantially orthogonal to the axial direction.

10. The variable stiffness vibration damping device according to claim 1, wherein the yoke includes:
a passage forming member forming the first circumferential passage and the second circumferential passage; and
a pair of stacked members stacked in the axial direction with the passage forming member therebetween, and
magnetic permeability of the passage forming member is lower than that of the pair of stacked members.

* * * * *